US009361826B2

(12) United States Patent
Kishi

(10) Patent No.: US 9,361,826 B2
(45) Date of Patent: Jun. 7, 2016

(54) DISPLAY DEVICE AND DRIVE METHOD THEREFOR

(75) Inventor: Noritaka Kishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 586 days.

(21) Appl. No.: 13/637,632

(22) PCT Filed: Jan. 25, 2011

(86) PCT No.: PCT/JP2011/051311

§ 371 (c)(1),
(2), (4) Date: Sep. 26, 2012

(87) PCT Pub. No.: WO2011/125361

PCT Pub. Date: Oct. 13, 2011

(65) Prior Publication Data

US 2013/0021312 A1 Jan. 24, 2013

(30) Foreign Application Priority Data

Apr. 2, 2010 (JP) ................................ 2010-086361

(51) Int. Cl.
*G06F 3/038* (2013.01)
*G09G 3/32* (2016.01)

(52) U.S. Cl.
CPC ............ *G09G 3/3225* (2013.01); *G09G 3/3275* (2013.01); *G09G 2300/0814* (2013.01); *G09G 2300/0819* (2013.01); *G09G 2300/0861* (2013.01); *G09G 2330/028* (2013.01)

(58) Field of Classification Search
CPC ............................................... G09G 2300/043
See application file for complete search history.

(56) References Cited

U.S. PATENT DOCUMENTS

2004/0004591 A1* 1/2004 Akimoto et al. ................ 345/84
2007/0115225 A1 5/2007 Uchino et al.
2007/0268210 A1 11/2007 Uchino et al.
2008/0030436 A1 2/2008 Iida et al.
2008/0111766 A1 5/2008 Uchino et al.
2008/0158110 A1* 7/2008 Iida et al. ........................ 345/76
2009/0122047 A1 5/2009 Yamamoto et al.
2009/0135111 A1 5/2009 Yamamoto et al.

(Continued)

FOREIGN PATENT DOCUMENTS

JP 2006-215275 A 8/2006
JP 2007-148128 A 6/2007

(Continued)

OTHER PUBLICATIONS

International Search Report received for PCT Patent Application No. PCT/JP2011/051311, mailed on Mar. 1, 2011, 5 pages (2 pages of English translation and 3 pages of Search Report).

*Primary Examiner* — Amare Mengistu
*Assistant Examiner* — Shawna Stepp Jones
(74) *Attorney, Agent, or Firm* — Morrison & Foerster LLP

(57) ABSTRACT

A display device 100 includes a plurality of pixel circuits 10 arranged two-dimensionally; a plurality of power lines VPi provided for respective rows of the pixel circuits 10; p common power lines 9, each connected to two or more power lines VPi; and a power control circuit 4. Each pixel circuit 10 includes an organic EL element, a plurality of TFTs, and a capacitor and receives an initialization potential from a corresponding power line VPi. The power control circuit 4applies a power supply potential and the initialization potential to the p common power lines 9 in a switching manner. Accordingly, a display device is provided that has a configuration in which an initialization potential is provided to pixel circuits from power lines and that has a power control circuit small in circuit size.

13 Claims, 15 Drawing Sheets

(56) References Cited

U.S. PATENT DOCUMENTS

2009/0244050 A1 10/2009 Yamamoto et al.
2009/0244057 A1* 10/2009 Seto .............................. 345/214

FOREIGN PATENT DOCUMENTS

JP 2007-148129 A 6/2007
JP 2007-310311 A 11/2007
JP 2007-316453 A 12/2007
JP 2008-33193 A 2/2008
JP 2008-122634 A 5/2008
JP 2009-133914 A 6/2009
JP 2009-139928 A 6/2009
JP 2009-237426 A 10/2009
JP 2009-244666 A 10/2009

* cited by examiner

DISPLAY DEVICE AND DRIVE METHOD THEREFOR

CROSS REFERENCE TO RELATED APPLICATIONS

This is a U.S. National Phase patent application of PCT/JP2011/051311, filed Jan. 25, 2011, which claims priority to Japanese Patent Application No. 2010-0866361, filed Apr. 2, 2010, each of which is hereby incorporated by reference in the present disclosure in its entirety.

TECHNICAL FIELD

The present invention relates to a display device and, more particularly to a display device using current-driven elements such as an organic EL display, and a drive method therefor.

BACKGROUND ART

As a thin, high image quality, and low power consumption display device, an organic EL (Electro Luminescence) display is known. The organic EL display includes a plurality of pixel circuits including an organic EL element and a driving transistor. When providing display on the organic EL display, there is a need to compensate for variations in the threshold voltage of the driving transistors and an increase in resistance caused by deterioration over time of the organic EL elements.

Various types of pixel circuits that perform compensation operation are conventionally known. Patent Document 1 describes a pixel circuit 80 shown in FIG. 18. The pixel circuit 80 includes TFTs (Thin Film Transistors) 81 to 85, a capacitor 86, and an organic EL element 87. When writing to the pixel circuit 80, first, the TFTs 82 and 84 are controlled to an on state to initialize the gate-source voltage of the TFT 85 (driving transistor). Then, the TFT 84 and the TFT 83 are controlled to an off state in turn to allow the capacitor 86 to hold the threshold voltage of the TFT 85. Then, a data potential is applied to a data line DTL and the TFT 81 is controlled to an on state. Accordingly, variations in the threshold voltage of the TFT 85 and an increase in resistance caused by deterioration over time of the organic EL element 87 can be compensated for.

The pixel circuit 80 is connected to the data line DTL, four control lines WSL, AZL1, AZL2, and DSL, and three power lines (a wiring line for Vofs, a wiring line for Vcc, and a wiring line for Vss). In general, the larger the number of wiring lines (particularly, control lines) connected to a pixel circuit, the more complex the circuit becomes, increasing manufacturing cost. Hence, Patent Document 1 describes a pixel circuit where the source terminal of the TFT 82 or the TFT 84 is connected to the control line WSL. Patent Document 2 describes a pixel circuit where the gate terminal of the TFT 82 is connected to a control line WSL in a previous row. By thus commonizing a control line and a power line, the number of wiring lines can be reduced.

Patent Document 3 describes a pixel circuit 90 shown in FIG. 19. The pixel circuit 90 includes TFTs 91 and 92, a capacitor 93, and an organic EL element 94. When writing to the pixel circuit 90, first, the TFT 91 is controlled to an on state. Then, an initialization potential is applied to a power line DSL to provide the initialization potential to the anode terminal of the organic EL element 94. Then, a power supply potential is applied to the power line DSL to allow the capacitor 93 to hold the threshold voltage of the TFT 92 (driving transistor). Then, a data potential is applied to a data line DTL. By thus providing an initialization potential from the power line, variations in the threshold voltage of the TFT 92 can be compensated for with a small number of elements. Patent Document 4 describes a pixel circuit where an initialization potential is provided from a power line and a reference potential is provided from a data line. Patent Document 5 describes a pixel circuit that performs compensation operation during a plurality of horizontal periods before writing.

PRIOR ART DOCUMENTS

Patent Documents

[Patent Document 1] Japanese Laid-Open Patent Publication No. 2006-215275

[Patent Document 2] Japanese Laid-Open Patent Publication No. 2007-316453

[Patent Document 3] Japanese Laid-Open Patent Publication No. 2007-310311

[Patent Document 4] Japanese Laid-Open Patent Publication No. 2007-148129

[Patent Document 5] Japanese Laid-Open Patent Publication No. 2008-33193

SUMMARY OF THE INVENTION

Problems to be Solved by the Invention

By applying the methods described in Patent Documents 1 and 2 to the pixel circuit 80 shown in FIG. 18, the number of wiring lines connected to the pixel circuit can be reduced. However, a pixel circuit obtained according to the methods has a problem that there are a large number of TFTs. On the other hand, the pixel circuit 90 shown in FIG. 19 has a small number of TFTs. However, when the pixel circuit 90 is used, the power line DSL needs to be driven in conjunction with a control line WSL. Hence, a power control circuit requires output buffers which are of the same number as the power lines DSLs. In addition, since the potential of the power line DSL needs to change in a short time in accordance with a selection period of the control line WSL, the output buffers provided in the power control circuit require high current capability. Therefore, the pixel circuit 90 has a problem that the circuit size and power consumption of the power control circuit increase.

An object of the present invention is therefore to provide a display device having a configuration in which an initialization potential is provided to pixel circuits from power lines, and having a power control circuit small in circuit size.

Means for Solving the Problems

According to a first aspect of the present invention, there is provided a current-driven type display device, including: a plurality of pixel circuits arranged two-dimensionally; a plurality of control lines provided for respective rows of the pixel circuits; a plurality of data lines provided for respective columns of the pixel circuits; a plurality of power lines provided to supply a power supply potential to the pixel circuits; a single or a plurality of common power lines, each connected to two or more of the power lines; a drive circuit that drives the control lines and the data lines; and a power control circuit that drives the power lines, wherein each of the pixel circuits includes: an electro-optic element; a driving transistor provided on a path of a current flowing through the electro-optic element; a write control transistor provided between a control terminal of the driving transistor and a corresponding one of the data lines; a light emission control transistor provided between one conduction terminal of the driving transistor and a corresponding one of the power lines; and a capacitor provided between an other conduction terminal and the control terminal of the driving transistor, and the power control circuit applies the power supply potential and an initialization potential to the common power line(s) in a switching manner.

According to a second aspect of the present invention, in the first aspect of the present invention, the drive circuit selects initialized pixel circuits on a row basis, and controls to allow each of the selected pixel circuits to perform detection of a threshold of the driving transistor, writing, and light emission in turn.

According to a third aspect of the present invention, in the second aspect of the present invention, the light emission control transistor is placed in an on state upon initialization, and the initialization potential is a potential at which the driving transistor is placed in an on state when the potential is applied to the power line upon initialization.

According to a fourth aspect of the present invention, in the third aspect of the present invention, the light emission control transistor is placed in an off state upon completion of the initialization and is placed in an on state upon threshold detection.

According to a fifth aspect of the present invention, in the fourth aspect of the present invention, the light emission control transistor is placed in an on state for a fixed period of time upon light emission.

According to a sixth aspect of the present invention, in the second aspect of the present invention, each of the pixel circuits further includes a reference potential application transistor provided between the control terminal of the driving transistor and a reference potential line.

According to a seventh aspect of the present invention, in the second aspect of the present invention, each of the pixel circuits further includes a reference potential application transistor that is provided between the control terminal of the driving transistor and a control line connected to the write control transistor, and that has a control terminal connected to a control line provided for pixel circuits in another row.

According to an eighth aspect of the present invention, in the second aspect of the present invention, upon threshold detection, a reference potential is applied to the data line and the write control transistor is placed in an on state.

According to a ninth aspect of the present invention, in the first aspect of the present invention, the display device includes a single common power line.

According to a tenth aspect of the present invention, in the first aspect of the present invention, the display device includes a plurality of common power lines, wherein the power lines are provided for the respective rows of the pixel circuits, and the power control circuit applies the initialization potential to the common power lines at different timings.

According to an eleventh aspect of the present invention, in the tenth aspect of the present invention, a plurality of power lines disposed adjacent to each other are connected to each of the common power lines.

According to a twelfth aspect of the present invention, in the tenth aspect of the present invention, a plurality of power lines selected every predetermined number of lines according to order of disposition are connected to each of the common power lines.

According to a thirteenth aspect of the present invention, in the first aspect of the present invention, all of the transistors included in the pixel circuit are of an N-channel type.

According to a fourteenth aspect of the present invention, there is provided a method of driving a current-driven type display device including a plurality of pixel circuits arranged two-dimensionally; a plurality of control lines provided for respective rows of the pixel circuits; a plurality of data lines provided for respective columns of the pixel circuits; a plurality of power lines provided to supply a power supply potential to the pixel circuits; and a single or a plurality of common power lines, each connected to two or more of the power lines, the method including the steps of: when each of the pixel circuits includes: an electro-optic element; a driving transistor provided on a path of a current flowing through the electro-optic element; a write control transistor provided between a control terminal of the driving transistor and a corresponding one of the data lines; a light emission control transistor provided between one conduction terminal of the driving transistor and a corresponding one of the power lines; and a capacitor provided between an other conduction terminal and the control terminal of the driving transistor, applying, using a power control circuit, the power supply potential and an initialization potential to the common power line(s) in a switching manner; controlling states of the transistors included in the pixel circuits by driving the control lines; and applying potentials corresponding to display data to the data lines.

Effects of the Invention

According to the first or fourteenth aspect of the present invention, by applying an initialization potential to the common power line(s) using the power control circuit, the initialization potential can be provided to the pixel circuits from the power lines. Accordingly, the number of elements in each pixel circuit can be reduced. In addition, the power control circuit drives the common power line(s), each connected to two or more power lines. Therefore, compared to the case of individually driving the power lines, the number of output buffers provided in the power control circuit is reduced, making it possible to reduce the circuit size of the power control circuit.

According to the second aspect of the present invention, initialized pixel circuits are selected on a row basis, and the selected pixel circuits perform threshold detection, writing, and light emission in turn. Accordingly, threshold voltages of the driving transistors are compensated for and then a screen can be displayed.

According to the third aspect of the present invention, by controlling the light emission control transistor to an on state by applying an initialization potential to the power line, the initialization potential can be applied to the other conduction terminal of the driving transistor.

According to the fourth aspect of the present invention, by controlling the light emission control transistor to an off state upon completion of initialization and controlling the light emission control transistor to an on state upon threshold detection, the pixel circuit can be allowed to turn off during a period from the initialization to the threshold detection. In addition, upon threshold detection, by supplying a current from the power line, a threshold of the driving transistor can be detected.

According to the fifth aspect of the present invention, by controlling the light emission control transistors to an on state for a fixed period of time upon light emission, the lengths of the light emission periods of the pixel circuits are made the same, making it possible to suppress variations in luminance. In addition, since the pixel circuits turn off during periods other than the light emission period, moving image performance can be improved as in the case of performing black insertion.

According to the sixth aspect of the present invention, by controlling the reference potential application transistor to an on state upon threshold detection, a reference potential is applied to the control terminal of the driving transistor from the reference potential line, making it possible to detect a threshold of the driving transistor. In addition, since the reference potential application transistor can be controlled to an on state at relatively flexible timing, a threshold detection period can be freely set.

According to the seventh aspect of the present invention, by controlling the reference potential application transistor to an on state upon threshold detection, a reference potential is applied to the control terminal of the driving transistor from the control line, making it possible to detect a threshold of the driving transistor. In addition, reference potential lines and control lines for reference potential application transistors can be removed.

According to the eighth aspect of the present invention, by controlling the write control transistor to an on state upon threshold detection, a reference potential is applied to the control terminal of the driving transistor from the data line, making it possible to detect a threshold of the driving transistor. In addition, without adding a transistor or a wiring line, a reference potential can be provided from the data line.

According to the ninth aspect of the present invention, the number of output buffers provided in the power control circuit is reduced to one, making it possible to reduce the circuit size of the power control circuit.

According to the tenth aspect of the present invention, the number of output buffers provided in the power control circuit is made smaller than the number of power lines, making it possible to reduce the circuit size of the power control circuit. In addition, by applying an initialization potential to the common power lines at different timings, initialization of the pixel circuits can be performed at suitable timing in accordance with a selection period of the pixel circuits.

According to the eleventh aspect of the present invention, writing can be performed to the pixel circuits according to the order on a display screen.

According to the twelfth aspect of the present invention, the amounts of current flowing through the common power lines are made the same, making it possible to prevent the occurrence of a difference in luminance on a screen.

According to the thirteenth aspect of the present invention, by configuring the transistors included in the pixel circuit by the same conductive type of transistors, the manufacturing cost of a display device including pixel circuits can be reduced.

MODES FOR CARRYING OUT THE INVENTION (First Embodiment)

Figure 1:
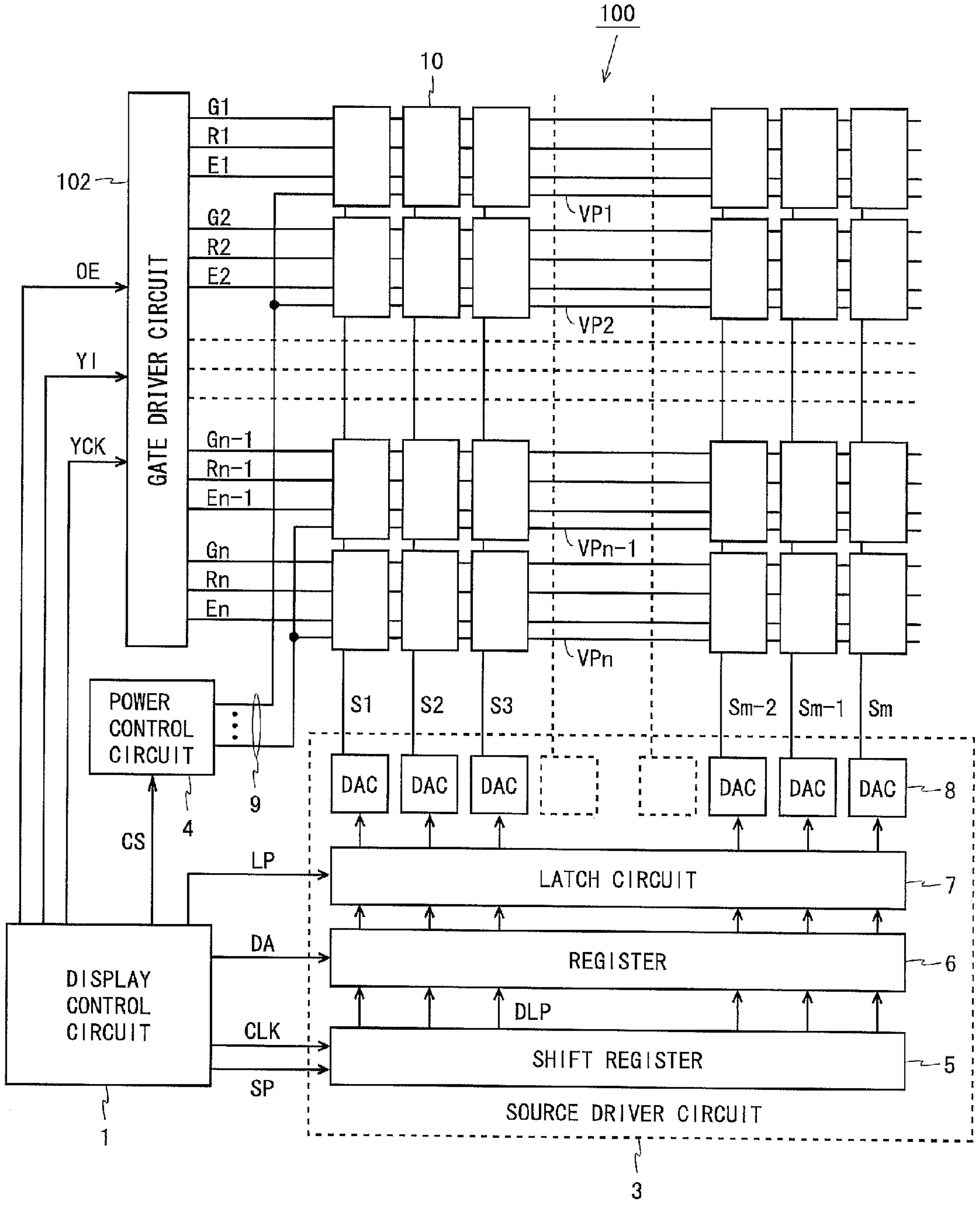
FIG. 1 is a block diagram showing a configuration of a display device according to a first embodiment of the present invention.

FIG. 1 is a block diagram showing a configuration of a display device according to a first embodiment of the present invention. A display device 100 shown in FIG. 1 is an organic EL display including a display control circuit 1, a gate driver circuit 102, a source driver circuit 3, a power control circuit 4, and (m×n) pixel circuits 10. In the following, m and n are integers not smaller than 2, i is an integer between 1 and n inclusive, and j is an integer between 1 and m inclusive.

In the display device 100, n control lines Gi parallel to one another and m data lines Sj parallel to one another and intersecting with the control lines Gi perpendicularly are provided. The (m×n) pixel circuits 10 are arranged two-dimensionally at respective intersections of the control lines Gi and the data lines Sj. In addition, n control lines Ri, n control lines Ei, and n power lines VPi are provided parallel to the control lines Gi. Furthermore, to connect the power control circuit 4 to the power lines VPi, p common power lines 9 (p is an integer not smaller than 1) are provided. The control lines Gi, Ri, and Ei are connected to the gate driver circuit 102, and the data lines Sj are connected to the source driver circuit 3. The power lines VPi are connected to the power control circuit 4 through the common power lines 9. A reference potential Vref and a common potential Vcom are supplied to the pixel circuits 10 by means which are not shown.

The display control circuit 1 outputs control signals to the gate driver circuit 102, the source driver circuit 3, and the power control circuit 4. More specifically, the display control circuit 1 outputs a timing signal OE, a start pulse YI, and a clock YCK to the gate driver circuit 102, outputs a start pulse SP, a clock CLK, display data DA, and a latch pulse LP to the source driver circuit 3, and outputs a control signal CS to the power control circuit 4.

The gate driver circuit 102 includes a shift register circuit, a logic operation circuit, and a buffer (none of which are shown). The shift register circuit sequentially transfers the start pulse YI in synchronization with the clock YCK. The logic operation circuit performs a logic operation between a pulse outputted from each stage of the shift register circuit and the timing signal OE. An output from the logic operation circuit is provided to corresponding control lines Gi, Ri, and Ei through the buffer. To each control line Gi are connected m pixel circuits 10, and m pixel circuits 10 are selected collectively using a corresponding control line Gi.

The source driver circuit 3 includes an m-bit shift register 5, a register 6, a latch circuit 7, and m D/A converters 8. The shift register 5 has m cascade-connected registers, and transfers the start pulse SP supplied to the first-stage register, in synchronization with the clock CLK and outputs timing pulses DLPs from the registers of the respective stages. Display data DA is supplied to the register 6 in accordance with the output timing of the timing pulses DLPs. The register 6 stores the display data DA according to the timing pulses DLPs. When display data DA for one row is stored in the register 6, the display control circuit 1 outputs the latch pulse LP to the latch circuit 7. When the latch circuit 7 receives the latch pulse LP, the latch circuit 7 holds the display data stored in the register 6. The D/A converters 8 are provided for the respective data lines Sj. The D/A converters 8 convert the display data held in the latch circuit 7 into analog voltages and apply the obtained analog voltages to the corresponding data lines Sj.

The power control circuit 4 has p output terminals for the p common power lines 9. The power control circuit 4 applies, based on the control signal CS, a power supply potential and an initialization potential to the common power lines 9 in a switching manner. When p=1, all of the power lines VPi are connected to a single common power line 9. In this case, the power control circuit 4 applies the initialization potential to the single common power line 9 at predetermined timing. When p≥2, the power lines VPi are grouped into p groups and power lines included in each group are connected to the same common power line 9. In this case, the power control circuit 4 applies the initialization potential to the p common power lines 9 at different timings. In the following, it is assumed that the power supply potential is a high-level potential and the initialization potential is a low-level potential.

Figure 2:
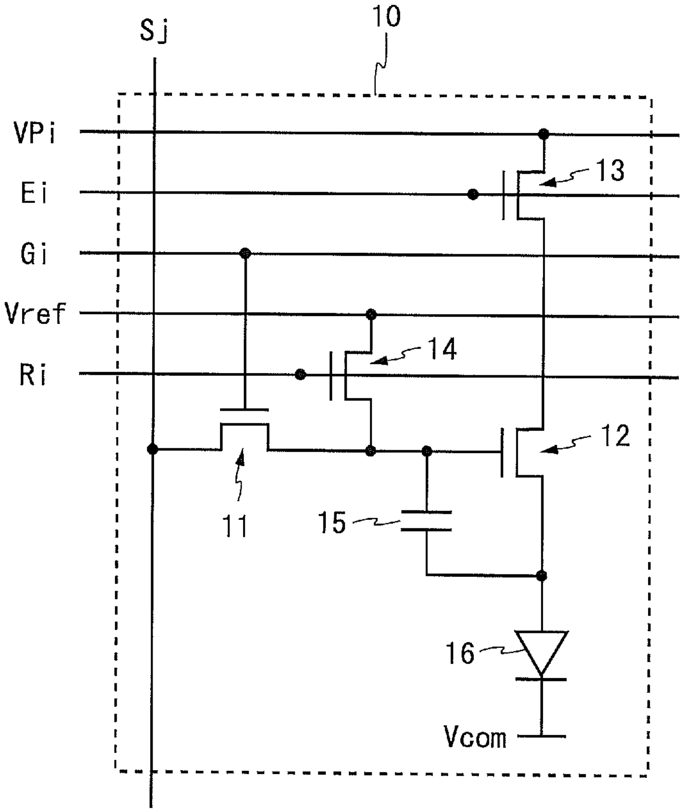
FIG. 2 is a circuit diagram of a pixel circuit included in the display device shown in FIG. 1.

FIG. 2 is a circuit diagram of the pixel circuit 10. As shown in FIG. 2, the pixel circuit 10 includes TFTs 11 to 14, a capacitor 15, and an organic EL element 16. The TFTs 11 to 14 are all N-channel type transistors. The TFTs 11 to 14 respectively function as a write control transistor, a driving transistor, a light emission control transistor, and a reference potential application transistor. The organic EL element 16 functions as an electro-optic element.

As shown in FIG. 2, the pixel circuit 10 is connected to the control lines Gi, Ri, and Ei, the data line Sj, the power line VPi, a wiring line having a reference potential Vref, and an electrode having a common potential Vcom. One conduction terminal of the TFT 11 is connected to the data line Sj and the other conduction terminal of the TFT 11 is connected to the gate terminal of the TFT 12. The drain terminal of the TFT 13 is connected to the power line VPi and the source terminal of the TFT 13 is connected to the drain terminal of the TFT 12. The reference potential Vref is applied to the drain terminal of the TFT 14 and the source terminal of the TFT 14 is connected to the gate terminal of the TFT 12. The source terminal of the TFT 12 is connected to the anode terminal of the organic EL element 16. The common potential Vcom is applied to the cathode terminal of the organic EL element 16. The capacitor 15 is provided between the gate and source terminals of the TFT 12. The gate terminals of the TFTs 11, 13, and 14 are connected to the control lines Gi, Ei, and Ri, respectively.

Figure 3:
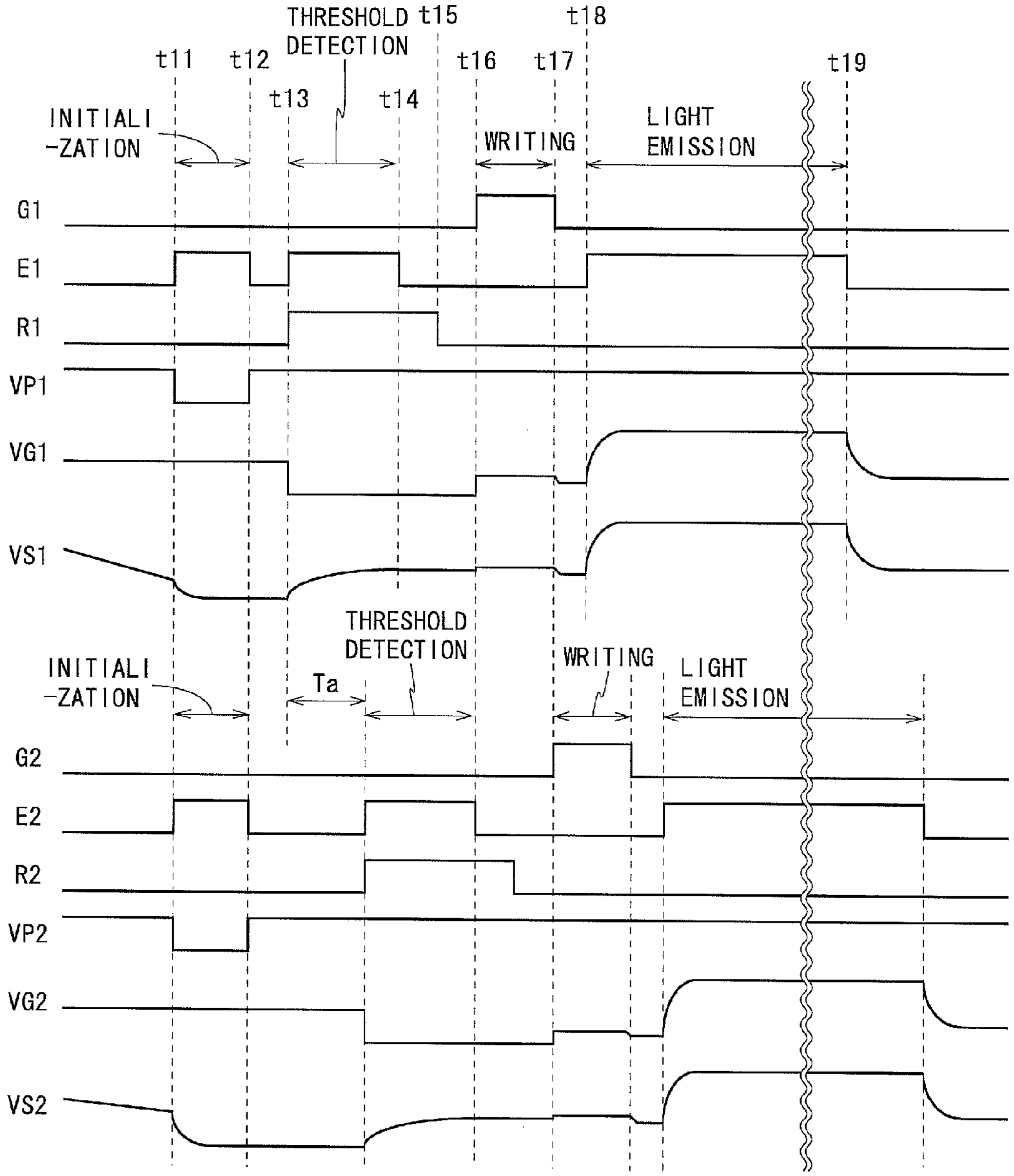
FIG. 3 is a timing chart showing a method of driving the pixel circuits in the display device shown in FIG. 1.

FIG. 3 is a timing chart showing a method of driving the pixel circuits 10. In FIG. 3, VGi indicates the gate potential of the TFT 12 included in a pixel circuit in an i-th row, and VSi indicates the source potential of the TFT (the anode potential of the organic EL element 16). Each pixel circuit 10 performs initialization, threshold detection (detection of a threshold of a TFT 12), writing, and light emission each once during one frame period, and turns off during periods other than a light emission period.

With reference to FIG. 3, the operation of the pixel circuits in the first row will be described below. Prior to time t11, the potentials of control lines G1, R1, and E1 are at a low level and the potential of a power line VP1 is at a high level. At time t11, the potential of the control line E1 changes to a high level and the potential of the power line VP1 changes to a low level (hereinafter, the low-level potential of the power line VPi is referred to as VP_L). For the potential VP_L, a sufficiently low potential, specifically, a potential lower than the gate potential of the TFT 12 immediately before time t11, is used. Hence, after time t11, the TFT 12 is placed in an on state. In addition, since the TFT 13 is also placed in an on state, the source potential VS1 of the TFT 12 is substantially equal to VP_L.

At time t12, the potential of the control line E1 changes to a low level and the potential of the power line VP1 changes to a high level. After time t12, the TFT 13 is placed in an off state. Hence, even if the potential of the power line VP1 is changed, the source potential VS1 of the TFT 12 remains at substantially VP_L.

At time t13, the potentials of the control lines R1 and E1 change to a high level. After time t13, the TFTs 13 and 14 are placed in an on state and the reference potential Vref is applied to the gate terminal of the TFT 12. The reference potential Vref is determined such that the TFT 12 is placed in an on state immediately after time t13 and the voltage applied to the organic EL element 16 does not exceed a light emission threshold voltage after time t13. Hence, after time t13, the TFT 12 is placed in an on state but a current does not flow through the organic EL element 16. Therefore, a current flows into the source terminal of the TFT 12 from the power line VP1 through the TFT 13 and the TFT 12 and thus the source potential VS1 of the TFT 12 rises. The source potential VS1 of the TFT 12 rises until the gate-source voltage Vgs becomes equal to the threshold voltage Vth, and reaches (Vref−Vth).

At time t14, the potential of the control line E1 changes to a low level. After time t14, the TFT 13 is placed in an off state. At time t15, the potential of the control line R1 changes to a low level. After time t15, the TFT 14 is placed in an off state.

At time t16, the potential of the control line G1 changes to a high level and the potential of a data line Sj (not shown) reaches a level corresponding to display data (hereinafter, the potential of the data line Sj at this time is referred to as a data potential Vda). After time t16, the TFT 11 is placed in an on state and the gate potential VG1 of the TFT 12 changes from Vref to Vda. The gate-source voltage Vgs of the TFT 12 after time t16 is given by the following equation (1):

$$Vgs=\{C_{OLED}/(C_{OLED}+C_{st})\}\times(Vda-V\mathrm{ref})+Vth \quad (1).$$

Note that in equation (1) $C_{OLED}$ is the capacitance value of the organic EL element 16 and $C_{st}$ is the capacitance value of the capacitor 15.

The capacitance value of the organic EL element 16 is sufficiently large and thus $C_{OLED} \gg C_{st}$ holds true. Hence, equation (1) can be transformed into the following equation (2):

$$Vgs=Vda-Vref+Vth \quad (2).$$

As such, when the gate potential VG1 of the TFT 12 is changed from Vref to Vda, the source potential VS1 of the TFT 12 does not change almost at all and the gate-source voltage Vgs of the TFT 12 reaches substantially (Vda−Vref+Vth).

At time t17, the potential of the control line G1 changes to a low level. After time t17, the TFT 11 is placed in an off state. Hence, even if the potential of the data line Sj changes, the gate-source voltage Vgs of the TFT 12 remains at substantially (Vda−Vref+Vth).

At time t18, the potential of the control line E1 changes to a high level. After time t18, the TFT 13 is placed in an on state and the drain terminal of the TFT 12 is connected to the power line VP1 through the TFT 13. Since the potential of the power line VP1 is at a high level at this time, a current flows into the source terminal of the TFT 12 from the power line VP1 through the TFT 13 and the TFT 12 and thus the source potential VS1 of the TFT 12 rises. At this time point, the gate terminal of the TFT 12 is in a floating state. Therefore, when the source potential VS1 of the TFT 12 rises, the gate potential VG1 of the TFT 12 also rises. At this time, the gate-source voltage Vgs of the TFT 12 is maintained substantially constant.

The high-level potential applied to the power line VPi is determined such that the TFT 12 operates in a saturation region during a light emission period (time t18 to t19). Hence, a current I flowing through the TFT 12 during the light emission period is given by the following equation (3), ignoring the channel-length modulation effect:

$$I=\tfrac{1}{2}\cdot W/L\cdot\mu\cdot Cox(Vgs-Vth)^2 \quad (3).$$

Note that in equation (3) W is the gate width, L is the gate length, μ is the carrier mobility, and Cox is the capacitance of a gate oxide film.

The following equation (4) is derived from equation (2) and equation (3):

$$I=\tfrac{1}{2}\cdot W/L\cdot\mu\cdot Cox\,(Vda-Vref)^2 \quad (4).$$

The current I shown in equation (4) changes corresponding to the data potential Vda but does not depend on the threshold voltage Vth of the TFT 12. Therefore, even if the threshold voltage Vth varies or if the threshold voltage Vth changes over time, it is possible to make a current corresponding to the data potential Vda flow through the organic EL element 16 and to make the organic EL element 16 emit light at a desired luminance.

At time t19, the potential of the control line E1 changes to a low level. After time t19, the TFT 13 is placed in an off state. Hence, a current does not flow through the organic EL element 16 and thus the pixel circuit 10 turns off.

As such, the pixel circuits in the first row perform initialization at time t11 to t12, perform threshold detection at time t13 to t14, perform writing at time t16 to t17, and emit light at time t18 to t19, and turn off during time other than time t18 to t19. Pixel circuits in the second row perform initialization at time t11 to t12 as with the pixel circuits in the first row, and perform threshold detection, writing, and light emission, delayed by a predetermined time Ta from the pixel circuits in the first row. In general, pixel circuits in an i-th row perform initialization during the same period as that during which pixel circuits in other rows do, and perform threshold detection, writing, and light emission, delayed by a time Ta from pixel circuits in an (i-1)-th row.

Figure 4:
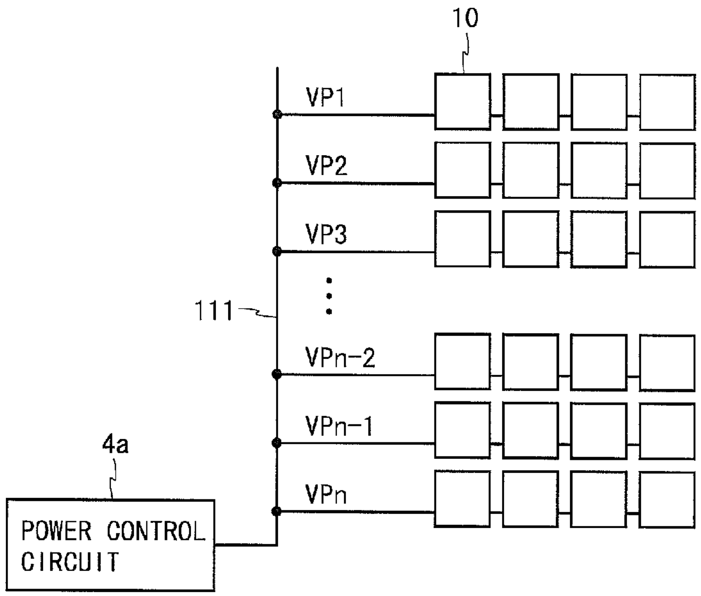
FIG. 4 is a diagram showing a connection configuration of power lines in a display device according to a first example.

As examples of the display device according to the present embodiment, the case of p=1 (first example), the case of p=2 (second and third examples), and the case of p=3 (fourth example) will be described below. FIG. 4 is a diagram showing a connection configuration of power lines VPi in a display device according to the first example. In the display device according to the first example, a single common power line 111 is provided to connect a power control circuit 4*a* to the power lines VPi. One end of the common power line 111 is connected to one output terminal provided in the power control circuit 4*a*, and all of the power lines VPi are connected to the common power line 111.

Figure 5:
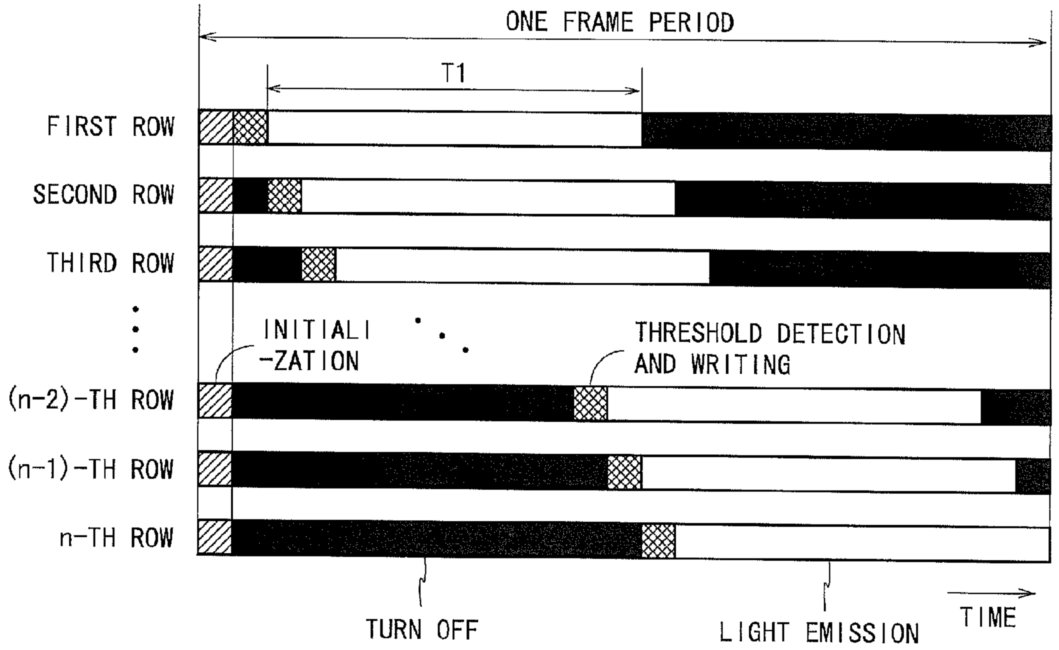
FIG. 5 is a diagram showing operations of pixel circuits in each row in the display device according to the first example.

FIG. 5 is a diagram showing operations of pixel circuits 10 in each row in the display device according to the first example. The power control circuit 4*a* applies a low-level potential to the common power line 111 for a predetermined period of time at the start of one frame period. Hence, the pixel circuits in all rows perform initialization at the start of one frame period. Then, pixel circuits in the first row are selected and the pixel circuits in the first row perform threshold detection and writing. Then, pixel circuits in the second row are selected and the pixel circuits in the second row perform threshold detection and writing. Thereafter, likewise, pixel circuits in the third to the n-th rows are selected in turn on a row-by-row basis, and the selected pixel circuits perform threshold detection and writing.

The pixel circuits in each row turn off during a period from initialization to threshold detection. The pixel circuits in each row need to emit light for the same amount of time, and light emission of pixel circuits in the n-th row needs to be completed before the end of one frame period. Hence, the pixel circuits in each row emit light for a fixed period of time T1 after writing and turn off during other periods of time.

In a common display device, writing to pixel circuits is performed over one frame period. On the other hand, in the example shown in FIG. 5, writing to pixel circuits is performed over about a ½ frame period. Hence, the scanning speed of the pixel circuits is about twice the normal scanning speed. In addition, in this example, the length T1 of the light emission period of the pixel circuits is about a ½ frame period. Note that the length of the light emission period may be made shorter than a ½ frame period, with the scanning speed of the pixel circuits remaining about twice the normal scanning speed. Alternatively, the scanning speed of the pixel circuits may be made faster than about twice the normal scanning speed and the length of the light emission period may be made longer than a ½ frame period.

Figure 6:
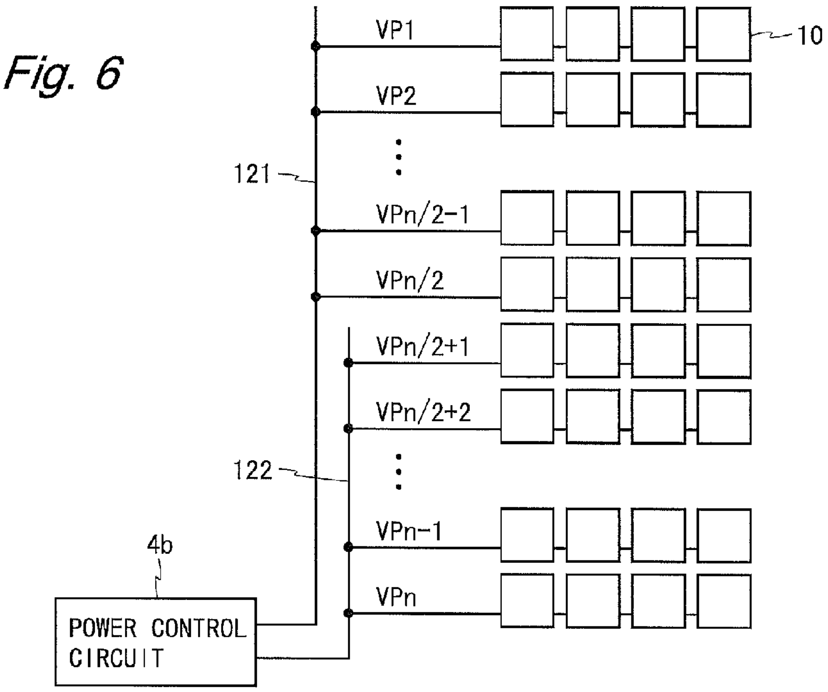
FIG. 6 is a diagram showing a connection configuration of power lines in a display device according to a second example.

FIG. 6 is a diagram showing a connection configuration of the power lines VPi in a display device according to the second example. In the display device according to the second example, two common power lines 121 and 122 are provided to connect a power control circuit 4*b* to the power lines VPi. Ends of the respective common power lines 121 and 122 are respectively connected to two output terminals provided in the power control circuit 4*b*. The power lines VP1 to VPn/2 are connected to the common power line 121, and the power lines VP(n/2+1) to VPn are connected to the common power line 122.

Figure 7:
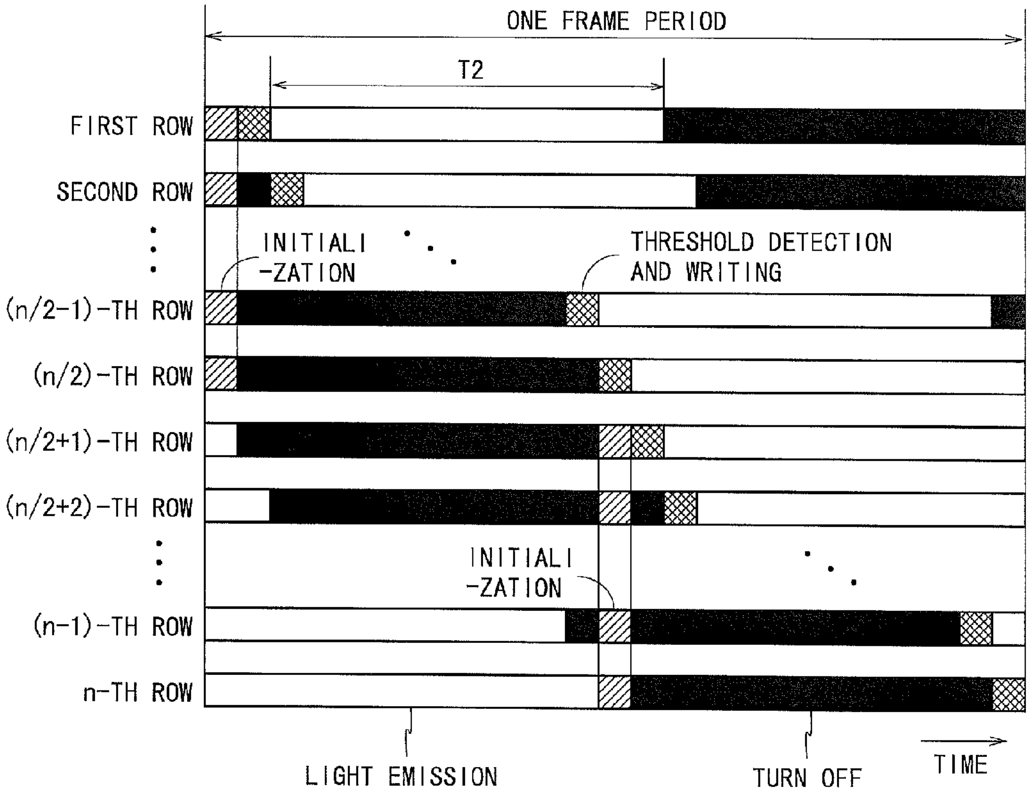
FIG. 7 is a diagram showing operations of pixel circuits in each row in the display device according to the second example.

FIG. 7 is a diagram showing operations of pixel circuits 10 in each row in the display device according to the second example. The power control circuit 4*b* applies a low-level potential to the common power line 121 for a predetermined period of time at the start of one frame period, and applies a low-level potential to the common power line 122 for the predetermined period of time after a lapse of a ½ frame period. Hence, pixel circuits in the first to the (n/2)-th rows perform initialization at the start of one frame period, and pixel circuits in the (n/2+1)-th to the n-th rows perform initialization, delayed by a ½ frame period. After the first initialization the pixel circuits in the first to the (n/2)-th rows are selected in turn on a row-by-row basis, and after the second initialization the pixel circuits in the (n/2+1)-th to the n-th rows are selected in turn on a row-by-row basis. The selected pixel circuits perform threshold detection and writing. The pixel circuits in each row emit light for a fixed period of time T2 after writing and turn off during other periods of time.

In the display device according to the second example, as in the first example, the pixel circuits in each row need to emit light for the same amount of time, but unlike the first example, light emission of pixel circuits in the n-th row does not need to be completed before the end of one frame period. In the example shown in FIG. 7, the scanning speed of the pixel circuits is the same as the normal scanning speed, and the length T2 of the light emission period of the pixel circuits is about a ½ frame period.

Figure 8:
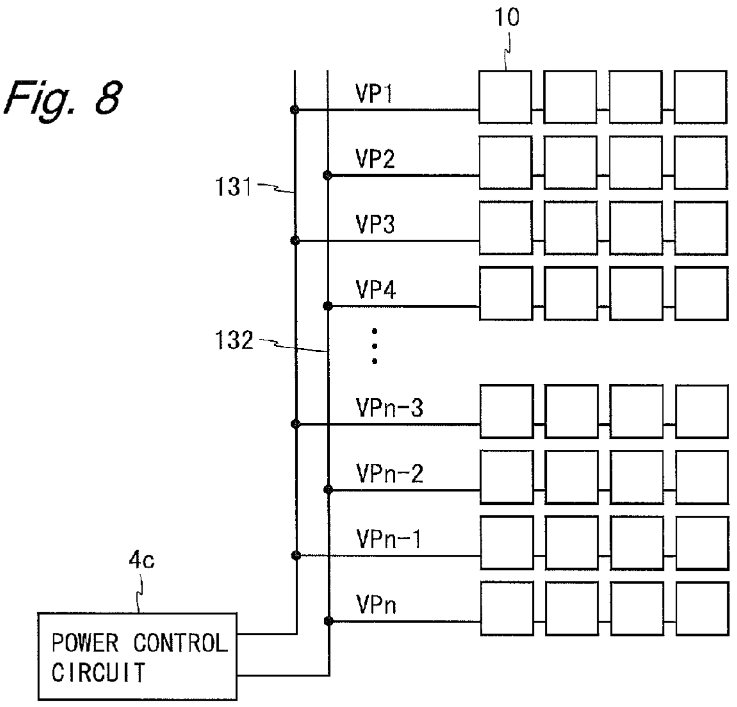
FIG. 8 is a diagram showing a connection configuration of power lines in a display device according to a third example.

FIG. 8 is a diagram showing a connection configuration of the power lines VPi in a display device according to the third example. In the display device according to the third example, two common power lines 131 and 132 are provided to connect a power control circuit 4*c* to the power lines VPi. Ends of the respective common power lines 131 and 132 are respectively connected to two output terminals provided in the power control circuit 4*c*. The power lines VP1, VP3, . . . for the odd-numbered rows are connected to the common power line 131, and the power lines VP2, VP4, . . . for the even-numbered rows are connected to the common power line 132.

Figure 9:
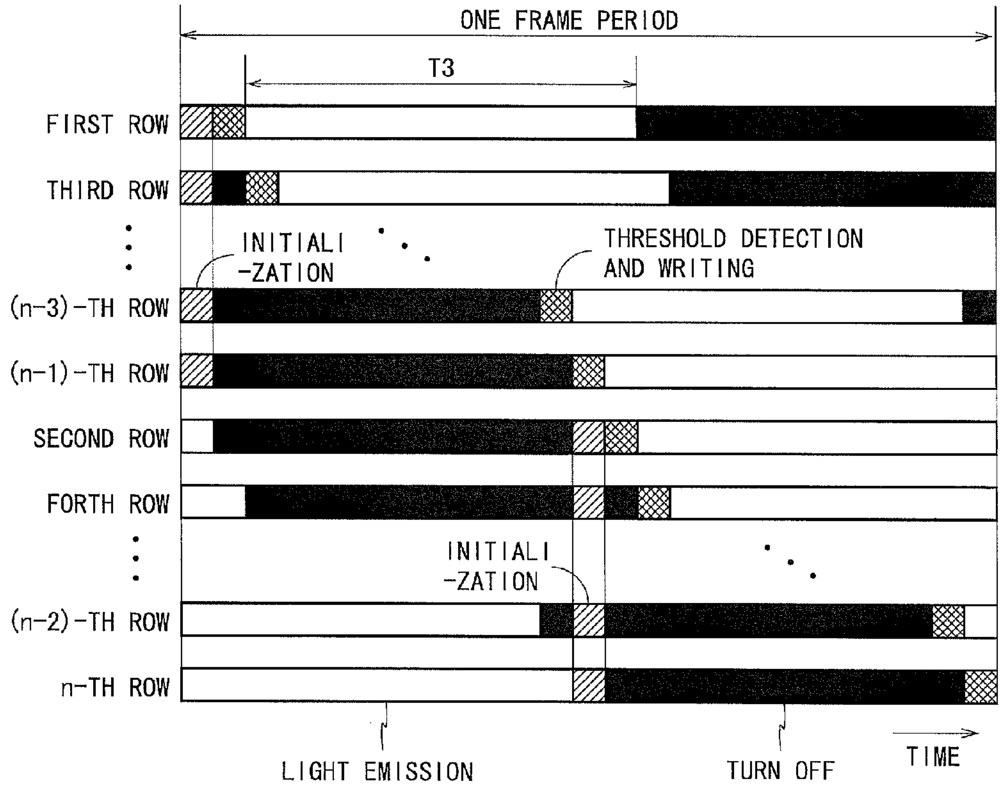
FIG. 9 is a diagram showing operations of pixel circuits in each row in the display device according to the third example.

FIG. 9 is a diagram showing operations of pixel circuits 10 in each row in the display device according to the third example. The power control circuit 4*c* applies a low-level potential to the common power line 131 for a predetermined period of time at the start of one frame period, and applies a low-level potential to the common power line 132 for the predetermined period of time after a lapse of a ½ frame period. Hence, pixel circuits in the odd-numbered rows perform initialization at the start of one frame period, and pixel circuits in the even-numbered rows perform initialization, delayed by a ½ frame period. After the first initialization the pixel circuits in the odd-numbered rows are selected in turn, and after the second initialization the pixel circuits in the even-numbered rows are selected in turn. The selected pixel circuits perform threshold detection and writing. The pixel circuits in each row emit light for a fixed period of time T3 after writing and turn off during other periods of time. In the example shown in FIG. 9, the scanning speed of the pixel circuits is the same as the normal scanning speed, and the length T3 of the light emission period of the pixel circuits is about a ½ frame period.

According to the display device according to the second example, writing can be performed to the pixel circuits according to the order on a display screen. However, when there is a big difference between the amounts of current flowing through the common power lines 121 and 122, such as when there is a big difference in luminance between the upper and lower halves of the screen, a difference in luminance may occur at the center of the screen. According to the display device according to the third example, in many cases, the amounts of current flowing through the common power lines 131 and 132 are substantially the same, and thus, a difference in luminance occurring at the center of the screen can be prevented.

Figure 10:
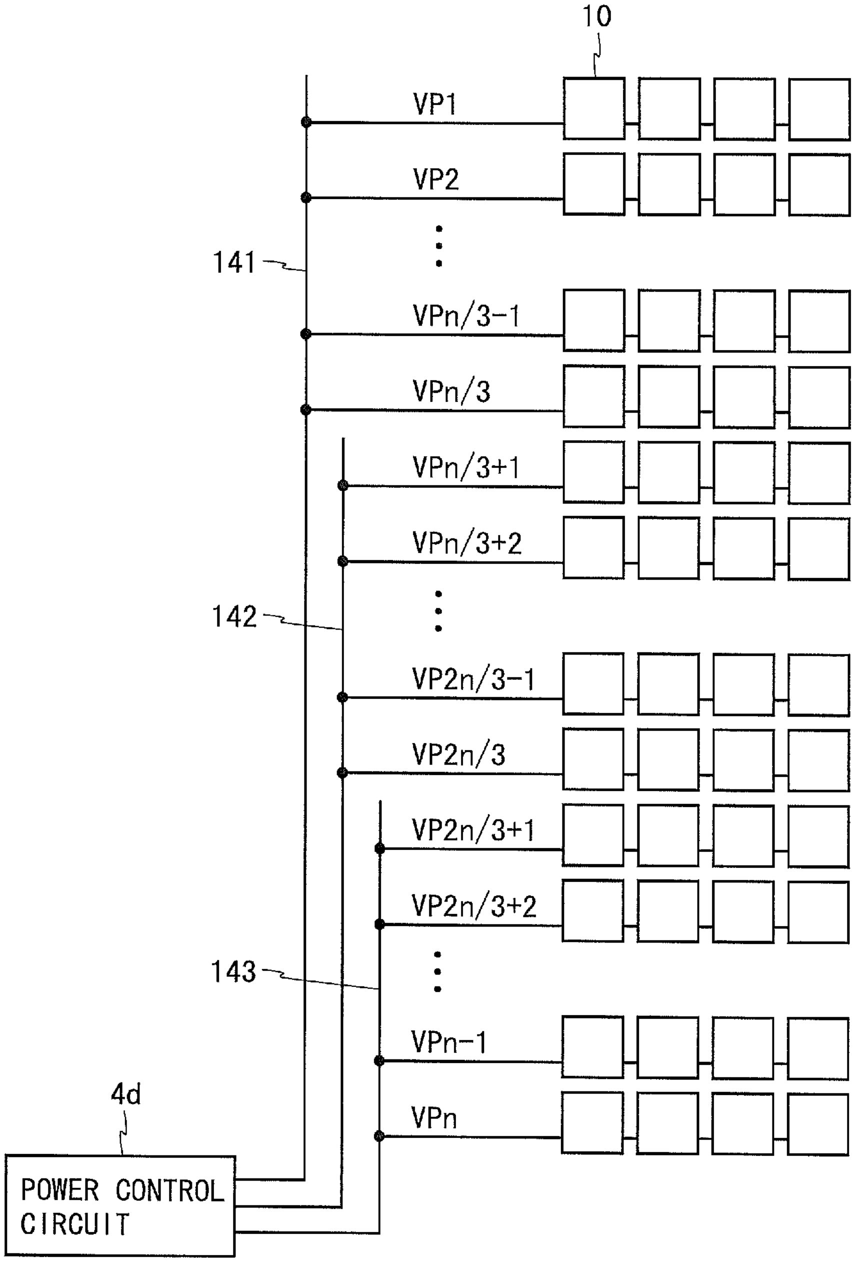
FIG. 10 is a diagram showing a connection configuration of power lines in a display device according to a fourth example.

FIG. 10 is a diagram showing a connection configuration of the power lines VPi in a display device according to the fourth example. In the display device according to the fourth example, three common power lines 141 to 143 are provided to connect a power control circuit 4*d* to the power lines VPi. Ends of the respective common power lines 141 to 143 are respectively connected to three output terminals provided in the power control circuit 4*d*. The power lines VP1 to VPn/3 are connected to the common power line 141, the power lines VP(n/3+1) to VP(2n/3) are connected to the common power line 142, and the power lines VP (2n/3+1) to VPn are connected to the common power line 143.

Figure 11:
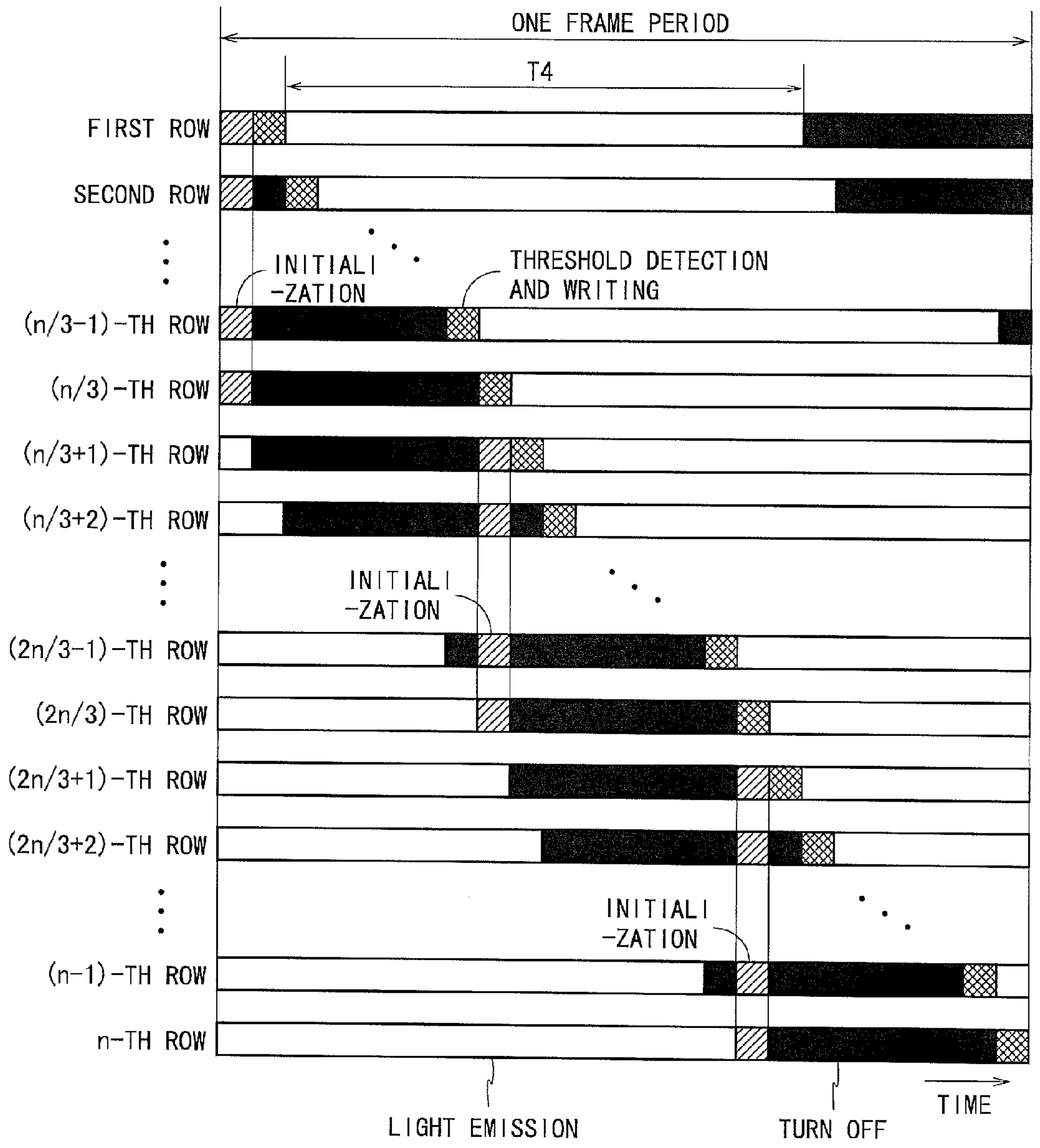
FIG. 11 is a diagram showing operations of pixel circuits in each row in the display device according to the fourth example.

FIG. 11 is a diagram showing operations of pixel circuits 10 in each row in the display device according to the fourth example. The power control circuit 4*d* applies a low-level potential to the common power line 141 for a predetermined period of time at the start of one frame period, applies a low-level potential to the common power line 142 for the predetermined period of time after a lapse of a ⅓ frame period, and applies a low-level potential to the common power line 143 for the predetermined period of time further after a lapse of a ⅓ frame period. Hence, pixel circuits in the first to the (n/3)-th rows perform initialization at the start of one frame period, pixel circuits in the (n/3+1)-th to the (2n/3)-th rows perform initialization, delayed by a ⅓ frame period, and pixel circuits in the (2n/3+1)-th to the n-th rows perform initialization, further delayed by a ⅓ frame period.

After the first initialization the pixel circuits in the first to the (n/3)-th rows are selected in turn on a row-by-row basis, and after the second initialization the pixel circuits in the (n/3+1)-th to the (2n/3)-th rows are selected in turn on a row-by-row basis, and after the third initialization the pixel circuits in the (2n/3+1) -th to the n-th rows are selected in turn on a row-by-row basis. The selected pixel circuits perform threshold detection and writing. The pixel circuits in each row emit light for a fixed period of time T4 after writing and turn off during other periods of time. In the example shown in FIG. 11, the scanning speed of the pixel circuits is the same as the normal scanning speed, and the length T4 of the light emission period of the pixel circuits is about a ⅔ frame period.

Note that the number p of the common power lines 9 may be 4 or more. When p≥4, the connection configuration of the power lines VPi and operations of pixel circuits 10 in each row are the same as those described above. In addition, when p≥3, (n/p) power lines disposed adjacent to each other may be connected to the same common power line, or (n/p) power lines selected every p-th line may be connected to the same common power line. For example, when p=3, the power lines VPi may be selected every third line and the power lines VP1, VP4, . . . may be connected to a first common power line, the power lines VP2, VP5, . . . to a second common power line, and the power lines VP3, VP6, . . . to a third common power line. When p=1, instead of providing n power lines VPi for the respective rows of the pixel circuits 10, m power lines may be provided for the respective columns of the pixel circuits 10.

As such, there is a trade-off relationship between the number p of the common power lines 9, the scanning speed of the pixel circuits 10, and the length of the light emission period of the pixel circuits 10. For example, by increasing the number p of the common power lines 9, the scanning speed of the pixel circuits 10 can be reduced or the light emission period of the pixel circuits 10 can be made longer. Note, however, that at this time the number of output buffers provided in the power control circuit 4 increases and thus the circuit size of the power control circuit 4 increases. Therefore, these parameters may be determined taking into account the specifications, cost, etc., of the display device.

As described above, the display device 100 according to the present embodiment includes a plurality of pixel circuits 10 arranged two-dimensionally; a plurality of control lines Gi, Ri, and Ei provided for the respective rows of the pixel circuits 10; a plurality of data lines Sj provided for the respective columns of the pixel circuits 10; a plurality of power lines VPi provided to supply a power supply potential to the pixel circuits 10; p common power lines 9, each connected to two or more power lines VPi; a gate driver circuit 102 that drives the control lines Gi, Ri, and Ei; a source driver circuit 3 that drives the data lines Sj; and a power control circuit 4 that drives the power lines VPi. Each pixel circuit 10 includes an organic EL element 16 (electro-optic element) ; a TFT 12 (driving transistor) provided on a path of a current flowing through the organic EL element 16; a TFT 11 (write control transistor) provided between the gate terminal of the TFT 12 and a corresponding data line Sj; a TFT 13 (light emission control transistor) provided between the drain terminal of the TFT 12 and a corresponding power line VPi; and a capacitor 15 provided between the source and gate terminals of the TFT 12. The power control circuit 4 applies the power supply potential and an initialization potential to the p common power lines 9 in a switching manner.

By thus applying the initialization potential to the common power lines 9 using the power control circuit 4, the initialization potential can be provided to the pixel circuits from the power lines VPi. Accordingly, the number of elements in each pixel circuit 10 can be reduced. In addition, the power control circuit 4 drives the common power lines 9, each connected to two or more power lines VPi. Therefore, compared to the case of individually driving the power lines VPi, the number of output buffers provided in the power control circuit 4 is reduced, making it possible to reduce the circuit size of the power control circuit 4.

In addition, the gate driver circuit 102 and the source driver circuit 3 (drive circuit) select initialized pixel circuits 10 on a row basis, and control to allow each of the selected pixel circuits 10 to perform detection of a threshold of the TFT 12, writing, and light emission in turn. Accordingly, the threshold voltage of the TFT 12 is compensated for and then a screen can be displayed.

In addition, the TFT 13 is placed in an on state upon initialization and the initialization potential is a potential at which the TFT 12 is placed in an on state when the potential is applied to the power line VPi upon initialization. Therefore, by controlling the TFT 13 to an on state by applying an initialization potential to the power line VPi, the initialization potential can be applied to the source terminal of the TFT 12. In addition, the TFT 13 is placed in an off state upon completion of initialization and is placed in an on state upon threshold detection. Accordingly, the pixel circuit 10 can be allowed to turn off during a period from the initialization to the threshold detection. In addition, upon threshold detection, by supplying a current from the power line VPi, the threshold of the TFT 12 can be detected. In addition, the TFT 13 is placed in an on state for a fixed period of time upon light emission. Accordingly, the lengths of the light emission periods of the pixel circuits 10 are made the same, making it possible to suppress variations in luminance. In addition, since the pixel circuits 10 turn off during periods other than the light emission period, moving image performance can be improved as in the case of performing black insertion.

In addition, each pixel circuit 10 includes a TFT 14 (reference potential application transistor) provided between the gate terminal of the TFT 12 and a wiring line having a reference potential Vref (reference potential line). Therefore, by controlling the TFT 14 to an on state upon threshold detection, the reference potential Vref is applied to the gate terminal of the TFT 12 from the reference potential line, making it possible to detect a threshold of the TFT 12. In addition, since the TFT 14 can be controlled to an on state at any timing, a threshold detection period can be freely set.

In addition, according to the display device according to the first example (FIG. 4) that includes a single common power line 9, the number of output buffers provided in the power control circuit 4 is reduced to one, making it possible to reduce the circuit size of the power control circuit 4. In addition, according to the display devices according to the second to fourth examples (FIGS. 6, 8, and 10) that include a plurality of common power lines 9 and has power lines VPi provided for the respective rows of the pixel circuits 10, the number of output buffers provided in the power control circuit 4 is made smaller than the number of power lines VPi, making it possible to reduce the circuit size of the power control circuit 4. In addition, by applying the initialization potential to the common power lines 9 at different timings, initialization of the pixel circuits 10 can be performed at suitable timing in accordance with a selection period of the pixel circuits 10. By connecting a plurality of power lines VPi disposed adjacent to each other to each common power line 9, as in the display devices according to the second and fourth examples, writing can be performed to the pixel circuits 10 according to the order on a display screen. By connecting a plurality of power lines VPi selected every predetermined number of lines according to the order of disposition to each common power line 9, as in the display device according to the third example, the amounts of current flowing through the common power lines 9 are made the same, making it possible to prevent the occurrence of a difference in luminance on a screen. In addition, all of the transistors included in the pixel circuit 10 are of an N-channel type. By thus configuring the transistors included in the pixel circuit 10 by the same conductive type of transistors, the cost of the display device can be reduced.

Note that the gate potential of the TFT 12 upon the start of initialization is a data potential written previously and thus is not constant. Therefore, to securely place the TFT 12 in an on state upon initialization, the low-level potential VP_L of the power line VPi needs to be sufficiently low. In addition, to securely place the TFT 12 in an on state upon initialization, a potential at which the TFT 12 is placed in an on state may be provided to the gate terminal of the TFT 12 from the data line Sj or the reference potential line and the TFT 11 or the TFT 14 may be controlled to an on state.

(Second Embodiment)

Figure 12:
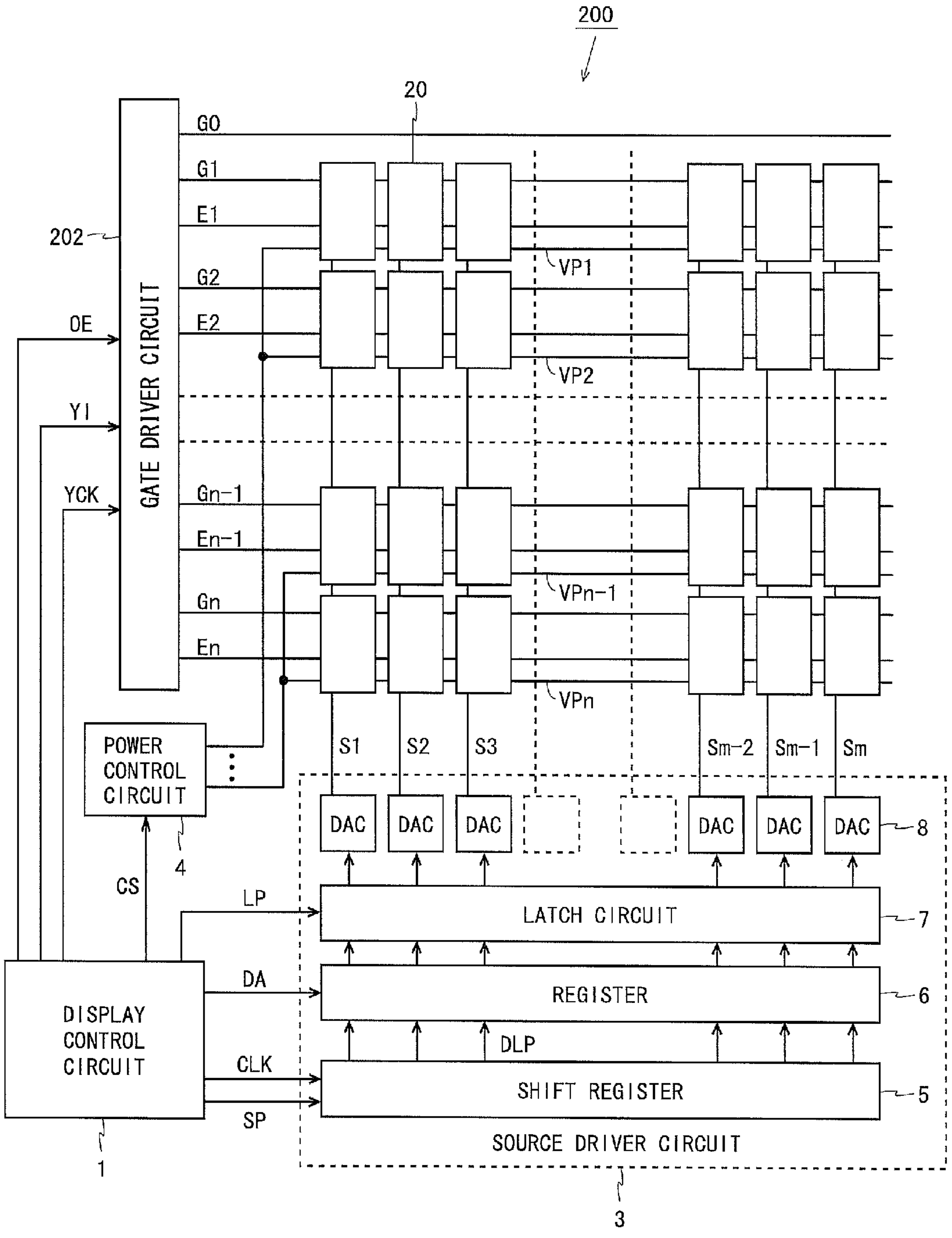
FIG. 12 is a block diagram showing a configuration of a display device according to a second embodiment of the present invention.

FIG. 12 is a block diagram showing a configuration of a display device according to a second embodiment of the present invention. A display device 200 shown in FIG. 12 includes a gate driver circuit 202 and pixel circuits 20 instead of the gate driver circuit 102 and the pixel circuits 10. Of the components of the present embodiment, the same components as those of the first embodiment are denoted by the same reference characters and description thereof is omitted.

In the display device 200, (n+1) control lines G0 to Gn are provided and n control lines Ei and n power lines VPi are provided parallel to the (n+1) control lines G0 to Gn. The control lines G0 to Gn and Ei are connected to the gate driver circuit 202. Though not shown, pixel circuits in an i-th row are also connected to a control line Gi-1 in a previous row. The display device 200 does not include control lines Ri or wiring lines for a reference potential Vref.

Figure 13:
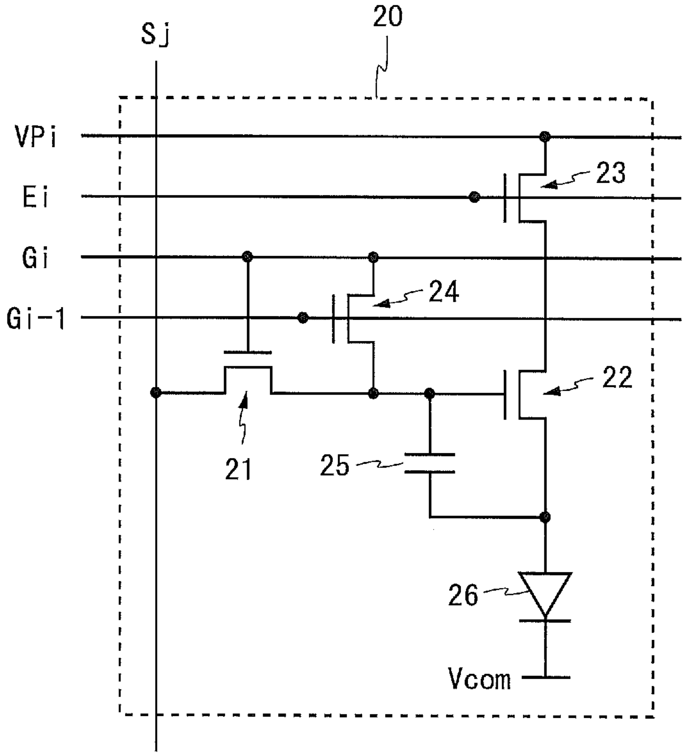
FIG. 13 is a circuit diagram of a pixel circuit included in the display device shown in FIG. 12.

FIG. 13 is a circuit diagram of the pixel circuit 20. As shown in FIG. 13, the pixel circuit 20 includes TFTs 21 to 24, a capacitor 25, and an organic EL element 26. The pixel circuit 20 is connected to the control lines Gi and Ei, a control line Gi-1 in a previous row, the data line Sj, a power line VPi, and an electrode having a common potential Vcom. In the pixel circuit 20, the drain terminal of the TFT 24 is connected to the control line Gi and the gate terminal of the TFT 24 is connected to the control line Gi-1 in the previous row. The configuration of the pixel circuit 20 is the same as that of a pixel circuit 10 except for the above-described points.

Figure 14:
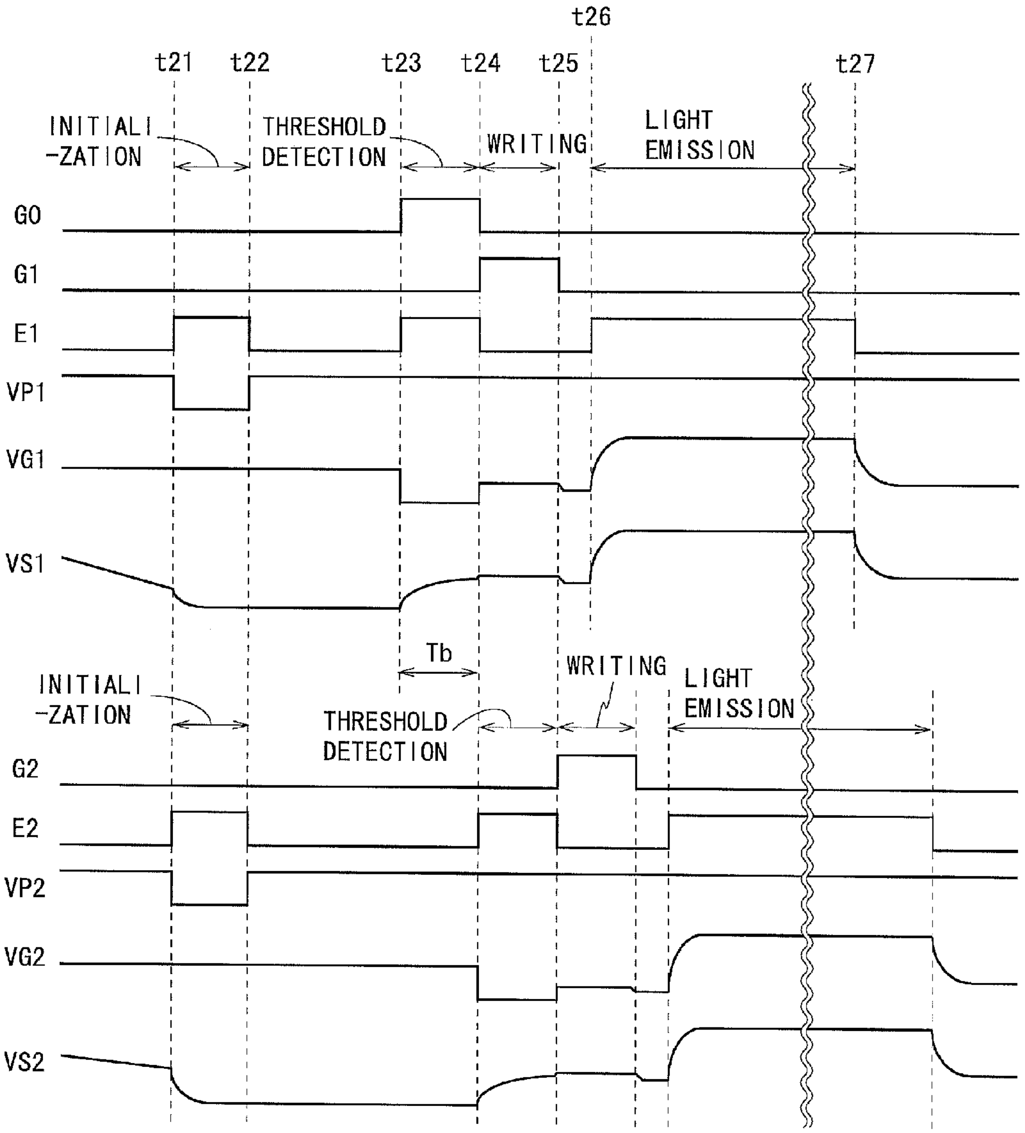
FIG. 14 is a timing chart showing a method of driving the pixel circuits in the display device shown in FIG. 12.

FIG. 14 is a timing chart showing a method of driving the pixel circuits 20. With reference to FIG. 14, the operation of the pixel circuits in the first row will be described below. The potential of the control line G0 is at a high level at time t23 to t24 and is at a low level during other time. For the pixel circuits in the first row, the waveforms prior to time t23 are the same as those prior to time t13 in FIG. 3.

At time t23, the potentials of the control lines G0 and E1 change to a high level. After time t23, the TFTs 23 and 24 are placed in an on state and thus the potential of the control line G1 is applied to the gate terminal of a TFT 22. At this time point, the potential of the control line G1 is at a low level (hereinafter, the low-level potential of the control line Gi is referred to as VG_L) and thus the potential VG_L is applied to the gate terminal of the TFT 22. The potential VG_L is determined such that the TFT 22 is placed in an on state immediately after time t23 and the voltage applied to the organic EL element 26 does not exceed a light emission threshold voltage after time t23. Hence, after time t23, the TFT 22 is placed in an on state but a current does not flow through the organic EL element 26. Therefore, a current flows into the source terminal of the TFT 22 from the power line VP1 through the TFT 23 and the TFT 22 and thus the source potential VS1 ofthe TFT 22 rises. The source potential VS1 of the TFT 22 rises until the gate-source voltage Vgs becomes equal to the threshold voltage Vth, and reaches (Vref−Vth).

At time t24, the potentials of the control lines G0 and E1 change to a low level, the potential of the control line G1 changes to a high level, and the potential of the data line Sj (not shown) reaches a data potential Vda. After time t24, the TFTs 23 and 24 are placed in an off state, the TFT 21 is placed in an on state, and the gate potential VG1 of the TFT 22 changes from Vref to Vda. For the pixel circuits in the first row, the waveforms after time t24 are the same as those after time t17 in FIG. 3.

As such, in the pixel circuit 20, compared to the pixel circuit 10 according to the first embodiment, the control line Ri and the control line Gi are commonized. Pixel circuits in an i-th row perform threshold detection during a selection period of pixel circuits in an (i-1)-th row (a period during which the potential of a control line Gi-1 is at a high level). During the threshold detection period, the reference potential is applied to the gate terminals of the TFTs 22 from a control line Gi.

As described above, in the display device 200 according to the present embodiment, a pixel circuit 20 includes a TFT 24 (reference potential application transistor) that is provided between the gate terminal of a TFT 22 (driving transistor) and a control line Gi connected to a TFT 21 (write control transistor), and that has a gate terminal connected to a control line Gi-1 provided for pixel circuits in another row. Therefore, by controlling the TFT 24 to an on state upon threshold detection, a reference potential is applied to the gate terminal of the TFT 22 from the control line Gi, making it possible to detect a threshold of the TFT 22. In addition, the numbers of wiring lines for the reference potential Vref and of control lines for the TFTs 24 can be reduced over the first embodiment.

Note that although in the pixel circuit 20 the gate terminal of the TFT 24 is connected to the control line Gi-1 in the previous row, the gate terminal of the TFT 24 may be connected to a control line Gi-x in an x-th previous row (x is an integer not smaller than 1). A display device according to this variant can also obtain the same advantageous effects.

(Third Embodiment)

Figure 15:
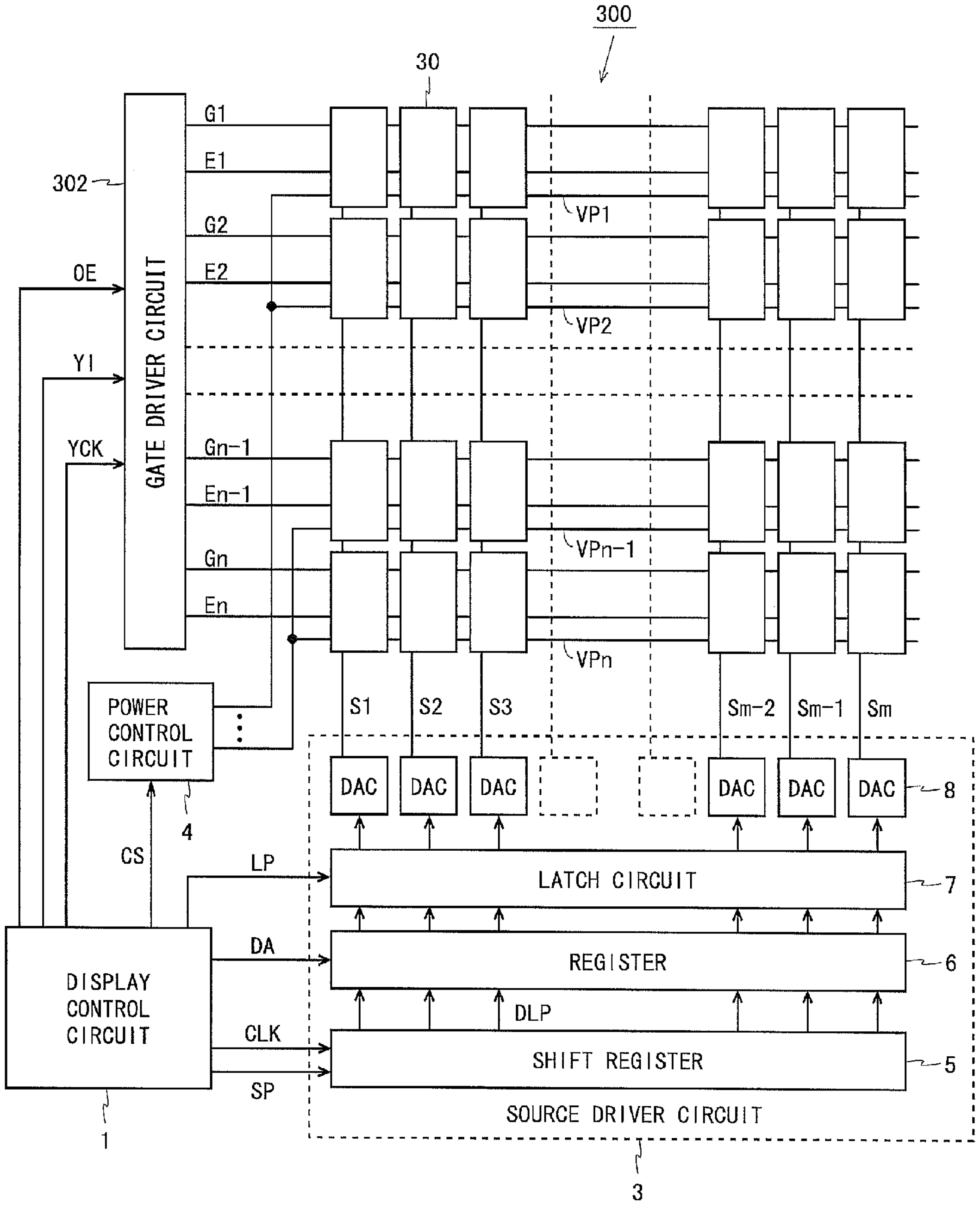
FIG. 15 is a block diagram showing a configuration of a display device according to a third embodiment of the present invention.

FIG. 15 is a block diagram showing a configuration of a display device according to a third embodiment of the present invention. A display device 300 shown in FIG. 15 includes a gate driver circuit 302 and pixel circuits 30 instead of the gate driver circuit 102 and the pixel circuits 10. Of the components of the present embodiment, the same components as those of the first embodiment are denoted by the same reference characters and description thereof is omitted.

In the display device 300, n control lines Ei and n power lines VPi are provided parallel to n control lines Gi. The control lines Gi and Ei are connected to the gate driver circuit 302. The display device 300 does not include control lines Ri or wiring lines for a reference potential Vref.

Figure 16:
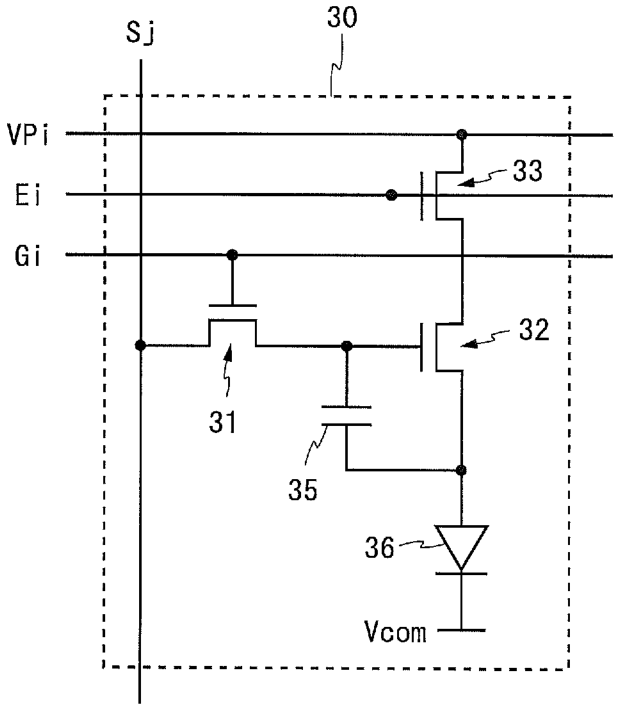
FIG. 16 is a circuit diagram of a pixel circuit included in the display device shown in FIG. 15.

FIG. 16 is a circuit diagram of the pixel circuit 30. As shown in FIG. 16, the pixel circuit 30 includes TFTs 31 to 33, a capacitor 35, and an organic EL element 36. The pixel circuit 30 is connected to the control lines Gi and Ei, the data line Sj, a power line VPi, and an electrode having a common potential Vcom. The pixel circuit 30 does not include a TFT (reference potential application transistor) corresponding to the TFT 14. The configuration of the pixel circuit 30 is the same as that of the pixel circuit 10 except for the above-described points.

Figure 17:
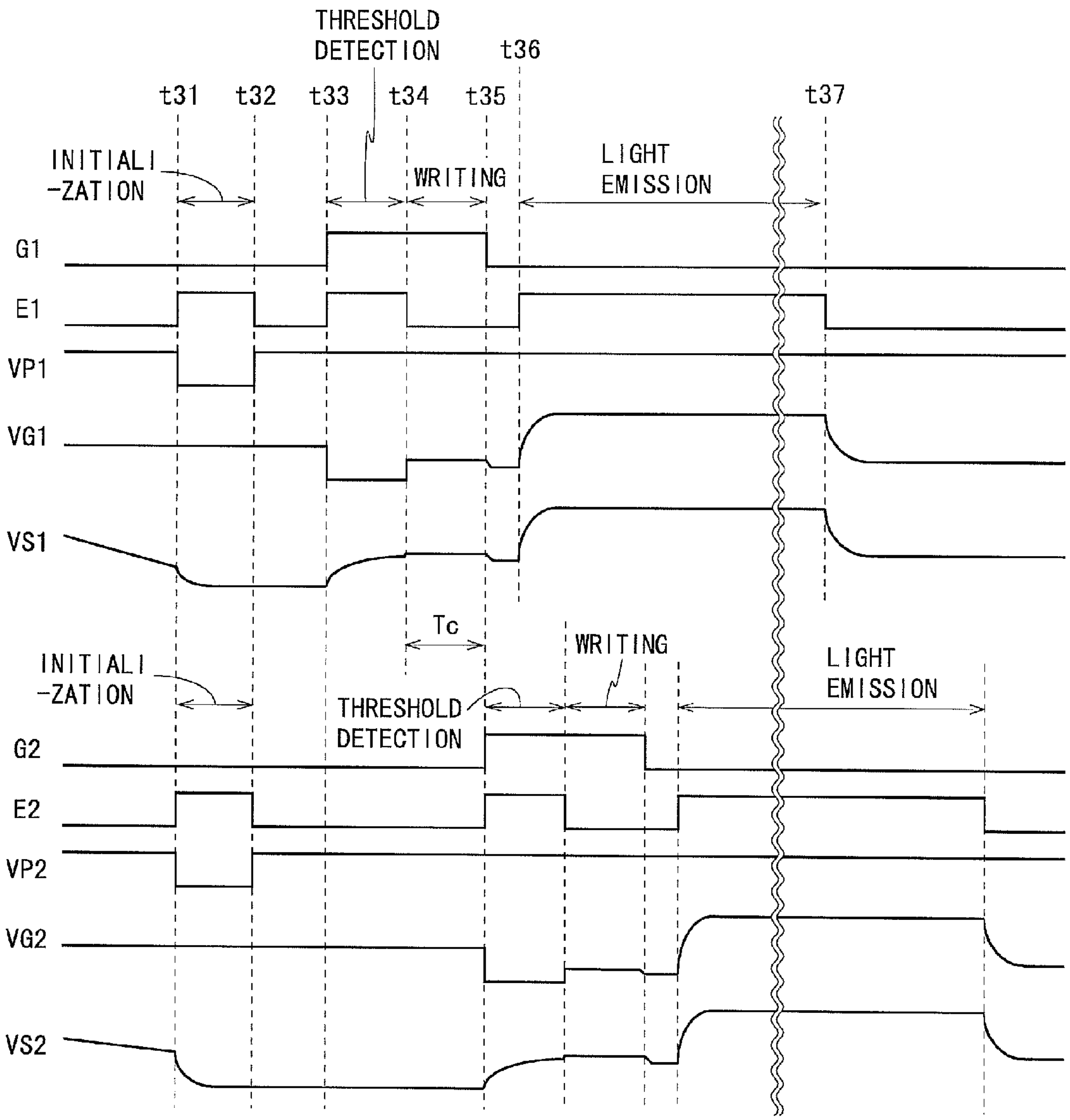
FIG. 17 is a timing chart showing a method of driving the pixel circuits in the display device shown in FIG. 15.
Figure 18:
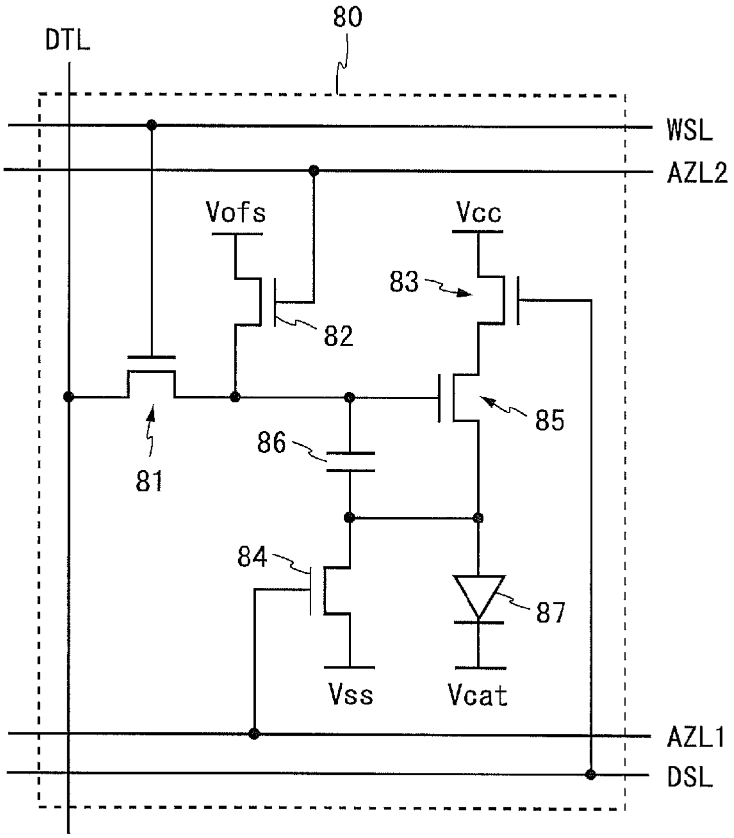
FIG. 18 is a circuit diagram of a pixel circuit included in a conventional display device.
Figure 19:
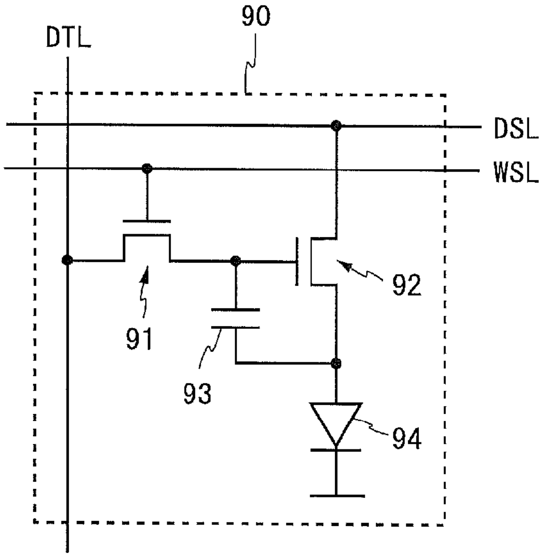
FIG. 19 is a circuit diagram of a pixel circuit included in a conventional display device.

FIG. 17 is a timing chart showing a method of driving the pixel circuits 30. With reference to FIG. 17, the operation of pixel circuits in the first row will be described below. For the pixel circuits in the first row, the waveforms prior to time t33 are the same as those prior to time t13 in FIG. 3.

At time t33, the potentials of the control lines G1 and E1 change to a high level. After time t33, the TFTs 31 and 33 are placed in an on state and the potential of the data line Sj is applied to the gate terminal of the TFT 32. At time t33 to t34, a reference potential Vref is applied to the data line Sj (not shown). Hence, the reference potential Vref is applied to the gate terminal of the TFT 32. The reference potential Vref is determined such that the TFT 32 is placed in an on state immediately after time t33 and the voltage applied to the organic EL element 36 does not exceed a light emission threshold voltage after time t33. Hence, after time t33, the TFT 32 is placed in an on state but a current does not flow through the organic EL element 36. Therefore, a current flows into the source terminal of the TFT 32 from the power line VP1 through the TFT 33 and the TFT 32 and thus the source potential VS1 of the TFT 32 rises. The source potential VS1 of the TFT 32 rises until the gate-source voltage Vgs becomes equal to the threshold voltage Vth, and reaches (Vref-Vth).

At time t34, the potential of the control line E1 changes to a low level and the potential of the data line Sj changes to a data potential Vda. After time t34, the TFT 33 is placed in an off state and the gate potential VG1 of the TFT 32 changes from Vref to Vda. For the pixel circuits in the first row, the waveforms after time t34 are the same as those after time t17 in FIG. 3.

As such, compared to the pixel circuit 10 according to the first embodiment, the pixel circuit 30 does not include a transistor for providing a reference potential to the gate terminal of the TFT 32. Pixel circuits in an i-th row perform threshold detection and writing during a selection period of the pixel circuits in the i-th row (a period during which the potential of a control line Gi is at a high level). During the threshold detection period, a reference potential is applied to the gate terminal of the TFT 32 from the data line Sj.

As described above, in the display device 300 according to the present embodiment, upon threshold detection, a reference potential is applied to a data line Sj and a TFT 31 (write control transistor) is placed in an on state. Therefore, upon threshold detection, by controlling the TFT 31 to an on state, a reference potential is applied to the gate terminal of a TFT 32 (driving transistor) from the data line Sj, making it possible to detect a threshold of the TFT 32. In addition, without adding a transistor or a wiring line, the reference potential can be provided to the pixel circuit 30 from the data line Sj.

Note that although in the description made so far a threshold detection period is inserted immediately before a write period, the present invention is not limited thereto. It is also possible to provide a threshold detection period in any period prior to a selection period of pixel circuits to be selected just before.

As described above, according to the present invention, a display device can be obtained that has a configuration in which an initialization potential is provided to pixel circuits from power lines and that has a power control circuit small in circuit size.

INDUSTRIAL APPLICABILITY

Display devices of the present invention have features that the display devices have a configuration in which an initialization potential is provided to pixel circuits from power lines, and have a power control circuit small in circuit size, and thus, can be used as display devices using current-driven elements such as organic EL displays.

DESCRIPTION OF REFERENCE CHARACTERS

1: DISPLAY CONTROL CIRCUIT
102, 202, and 302: GATE DRIVER CIRCUIT
3: SOURCE DRIVER CIRCUIT
4: POWER CONTROL CIRCUIT
5: SHIFT REGISTER
6: REGISTER
7: LATCH CIRCUIT
8: D/A CONVERTER
9, 111, 121, 122, 131, 132, and 141 to 143: COMMON POWER LINE
10, 20, and 30: PIXEL CIRCUIT
11, 21, and 31: TFT (WRITE CONTROL TRANSISTOR)
12, 22, and 32: TFT (DRIVING TRANSISTOR)
13, 23, and 33: TFT (LIGHT EMISSION CONTROL TRANSISTOR)
and 24: TFT (REFERENCE POTENTIAL APPLICATION TRANSISTOR)
15, 25, and 35: CAPACITOR
16, 26, and 36: ORGANIC EL ELEMENT (ELECTRO-OPTIC ELEMENT)
100, 200, and 300: DISPLAY DEVICE
Gi, Ri, and Ei: CONTROL LINE
Sj: DATA LINE
VPi: POWER LINE

The invention claimed is:

1. A current-driven type display device, comprising:
- a plurality of pixel circuits arranged two-dimensionally;
- a plurality of control lines provided for respective rows of the pixel circuits;
- a plurality of data lines provided for respective columns of the pixel circuits;
- a plurality of power lines provided to supply a power supply potential to the pixel circuits;
- a plurality of common power lines, each provided corresponding to two or more of the pixel circuits and connected to two or more of the power lines;
- a drive circuit that drives the control lines and the data lines; and
- a power control circuit that drives the power lines, wherein each of the pixel circuits includes:
  - an electro-optic element;
  - a driving transistor provided on a path of a current flowing through the electro-optic element;
  - a write control transistor provided between a control terminal of the driving transistor and a corresponding one of the data lines;
  - a light emission control transistor having a first conduction terminal directly connected to one conduction terminal of the driving transistor and a second conduction terminal directly connected to a corresponding one of the power lines; and
  - a capacitor provided between an other conduction terminal and the control terminal of the driving transistor,
- the power control circuit is configured to apply the power supply potential and an initialization potential to the common power line(s) in a switching manner,
- in the pixel circuits in the two or more rows corresponding to the common power line, the light emission control transistor is configured to be placed in an on state when the initialization potential is applied to the common power line,
- the drive circuit is configured to select, on a row basis, the pixel circuits in the two or more rows initialized by applying the initialization potential to the common power line, and controls to allow each of the selected pixel circuits to perform detection of a threshold of the driving transistor, writing, and light emission in turn, and
- the light emission control transistor is configured to be place in an off state upon completion of the initialization, is configured to be placed in an on state upon threshold detection, and is configured to be placed in an off state during a write period.

2. The display device according to claim 1, wherein the initialization potential is a potential at which the driving transistor is configured to be placed in an on state when the potential is applied to the power line upon initialization.

3. The display device according to claim 2, wherein the light emission control transistor is configured to be placed in an on state for a fixed period of time upon light emission.

4. The display device according to claim 1, wherein each of the pixel circuits further includes a reference potential application transistor provided between the control terminal of the driving transistor and a reference potential line.

5. The display device according to claim 1, wherein each of the pixel circuits further includes a reference potential application transistor that is provided between the control terminal of the driving transistor and a control line connected to the write control transistor, and that has a control terminal connected to a control line provided for pixel circuits in another row.

6. The display device according to claim 1, wherein
- upon threshold detection, a reference potential is applied to the data line and the write control transistor is placed in an on state, and
- in the pixel circuits in the two or more rows corresponding to the common power line, the write control transistor is configured to be placed in an on state in an on state in a period that is different for each row.

7. The display device according to claim 1, wherein
- the power control circuit is configured to apply the initialization potential to the common power lines at different timings.

8. The display device according to claim 7, wherein a plurality of power lines disposed adjacent to each other are connected to each of the common power lines.

9. The display device according to claim 7, wherein a plurality of power lines selected every predetermined number of lines according to order of disposition are connected to each of the common power lines.

10. The display device according to claim 1, wherein all of the transistors included in the pixel circuit are of an N-channel type.

11. The display device according to claim 1, wherein the power control circuit applies the initialization potential to the common power lines upon initialization, and applies the power supply potential to the common power lines upon threshold detection, writing, and light emission.

12. The display device according to claim 1, wherein the drive circuit sets a turn off period between an initialization period and a threshold detection period, and the turn off period has a length that is different for each row concerning the pixel circuits in the two or more rows corresponding to the common power line, so that a light emission period has a same length for all of the pixel circuits.

13. A method of driving a current-driven type display device including a plurality of pixel circuits arranged two-dimensionally; a plurality of control lines provided for respective rows of the pixel circuits; a plurality of data lines provided for respective columns of the pixel circuits; a plurality of power lines provided for respective rows of the pixel circuits to supply a power supply potential to the pixel circuits; and a single or a plurality of common power lines, each provided connected to two or more rows of the pixel circuits and connected to two or more of the power lines, the method comprising the steps of:

when each of the pixel circuits includes: an electro-optic element; a driving transistor provided on a path of a current flowing through the electro-optic element; a write control transistor provided between a control terminal of the driving transistor and a corresponding one of the data lines; a light emission control transistor having a first conduction terminal directly connected to one conduction terminal of the driving transistor and a second conduction terminal directly connected to corresponding one of the power lines; and a capacitor provided between an other conduction terminal and the control terminal of the driving transistor, applying, using a power control circuit, the power supply potential and an initialization potential to the common power line(s) in a switching manner;

controlling states of the transistors included in the pixel circuits by driving the control lines; and applying potentials corresponding to display data to the data lines, wherein in the pixel circuits in the two or more rows corresponding to the common power line, the light emission control transistor is placed in an on state when the initialization potential is applied to the common power line, the pixel circuits in the two or more rows are initialized by applying the initialization potential to the common power line are selected on arrow basis, each of the selected pixel circuits is controlled to perform detection of a threshold of the driving transistor, writing, and light emission in turn, and the light emission control transistor is placed in an off state upon completion of the initialization, is placed in an on state upon threshold detection, and is placed in off state during a write period.

* * * * *